United States Patent
Zuo et al.

(10) Patent No.: US 10,358,919 B2
(45) Date of Patent: Jul. 23, 2019

(54) RESERVOIR FLUID GEODYNAMICS SYSTEM AND METHOD

(71) Applicant: Schlumberger Technology Corporation, Sugar Land, TX (US)

(72) Inventors: Youxiang Zuo, Burnaby (CA); Shu Pan, Sugar Land, TX (US); Kang Wang, Beijing (CN); Oliver Mullins, Houston, TX (US); Ashers Partouche, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/428,534

(22) Filed: Feb. 9, 2017

(65) Prior Publication Data
US 2018/0223657 A1 Aug. 9, 2018

(51) Int. Cl.
*E21B 49/08* (2006.01)
*G01V 99/00* (2009.01)

(52) U.S. Cl.
CPC ...... *E21B 49/082* (2013.01); *E21B 2049/085* (2013.01); *G01V 99/005* (2013.01); *G01V 2210/624* (2013.01); *G01V 2210/663* (2013.01)

(58) Field of Classification Search
CPC ...... E21B 49/08; E21B 49/087; E21B 49/088; E21B 49/10; E21B 2049/085; E21B 47/065; E21B 47/06; G01V 99/005
See application file for complete search history.

(56) References Cited

U.S. PATENT DOCUMENTS

| 8,271,248 B2 | 9/2012 | Pomerantz et al. |
| 2016/0047208 A1 | 2/2016 | Chen et al. |
| 2016/0146004 A1 | 5/2016 | Wang et al. |

(Continued)

OTHER PUBLICATIONS

Wang et al., Differing Equilibration Times of GOR, Asphaltenes and Biomarkers as Determined by Charge History and Reservoir Fluid Geodynamics, Oct. 2015, PetroPhysics, vol. 56, No. 5, pp. 440-456.*

(Continued)

*Primary Examiner* — Toan M Le
(74) *Attorney, Agent, or Firm* — Michael Dae

(57) ABSTRACT

A method includes placing a downhole acquisition tool in a wellbore in a geological formation within a hydrocarbon reservoir that contains a reservoir fluid. The method also includes performing downhole fluid analysis using the downhole acquisition tool in the wellbore to determine a measurement associated with the reservoir fluid and using a processor to: estimate a fluid component property by using an equation of state based the measurement and simulate a diffusion process using a diffusive model that takes into account the estimated fluid property. The diffusive model accounts for gravitational diffusion of components in the reservoir fluid. The method also includes using the processor to estimate reservoir fluid geodynamic processes based on the fluid property; compare the estimated reservoir fluid geodynamic processes with the measurement associated with the reservoir fluid; and output reservoir fluid geodynamic processes corresponding to the measurement associated with the reservoir fluid.

20 Claims, 14 Drawing Sheets

(56) References Cited

U.S. PATENT DOCUMENTS

2017/0016321 A1 1/2017 Pan et al.

OTHER PUBLICATIONS

Elshahawi et al., Advanced Reservoir Evaluation Using Downhole Fluid Analysis and Asphaltene Flory-Huggins-Zuo Equation of State, Feb. 2013, Petrophysics, vol. 54, No. 1, pp. 20-29.*
Mullins et al., Evaluation of Coexisting Reservoir Fluid Gradient of GOR, Asphaltene and Biomarkers as Determined by Charge History and Reservoir Fluid Geodynamics, Jul. 18-22, 2015, SPWLA 56th Annual Logging Symposium, 14 pp.*
Zuo et al., Investigation of density inversion induced by gas charges into oil reservoirs using diffusion equations. Energy. 2016.
Krishna et al., The Maxwell-Stefan Approach to Mass Transfer. Chem. Eng. Sci. 1997, vol. 52, No. 6, pp. 861-911, Great Britain.
Freed et al., Theoretical treatment of asphaltenes in the presence of GOR gradients. Energy Fuels 2010. 24(7), pp. 3942-3949.
Zuo et al., Interpretation of DFA Color Gradients in Oil Columns Using the Flory-Huggins Solubility Model. SPE 130305. Presented at the CPS/SPE International Oil & Gas Conference and Exhibition in China, Beijing, China, Jun. 8-10, 2010.
Elshahawi et al., Integration of Geochemical, Mud Gas and Downhole Fluid Analyses for the Assessment of Compositional Grading—Case Studies. SPE 109684 presented at the SPE Annual Technical Conference and Exhibition, Anaheim, California, Nov. 11-14, 2007.
Pan et al., A multicomponent diffusion model for gas charges into oil reservoirs. Fuel, 180, pp. 384-395 Sep. 2016.

* cited by examiner

RESERVOIR FLUID GEODYNAMICS SYSTEM AND METHOD

BACKGROUND

This disclosure relates to determining one or more dynamic processes for a reservoir in a geological formation occurring over geological time.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Reservoir fluid analysis may be used to better understand a hydrocarbon reservoir in a geological formation. Indeed, reservoir fluid analysis may be used to measure and model fluid properties within the reservoir to determine a quantity and/or quality of formation fluids—such as liquid and/or gas hydrocarbons, condensates, drilling muds, and so forth—that may provide much useful information about the reservoir. This may allow operators to better assess the economic value of the reservoir, obtain reservoir development plans, and identify hydrocarbon production concerns for the reservoir. Numerous possible reservoir models may be used to describe the reservoir. For a given reservoir, however, different possible reservoir models may have varying degrees of accuracy. The accuracy of the reservoir model may impact plans for future well operations, such as enhanced oil recovery, logging operations, and dynamic formation analyses. As such, the more accurate the reservoir model, the greater the likely value of future well operations to the operators producing hydrocarbons from the reservoir.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method includes placing a downhole acquisition tool in a wellbore in a geological formation within a hydrocarbon reservoir. The wellbore or the geological formation, or both, contain a reservoir fluid. The method also includes performing downhole fluid analysis using the downhole acquisition tool in the wellbore to determine at least one measurement associated with the reservoir fluid and using a processor to: estimate at least one fluid component property by using an equation of state based at least in part on at least one measurement associated with the reservoir fluid and simulate a diffusion process using a diffusive model that takes into account the at least one estimated fluid property. The diffusive model accounts for gravitational diffusion of at least one or more components in the reservoir fluid. The method also includes using the processor to estimate one or more reservoir fluid geodynamic processes based at least in part on the at least one fluid property; compare the estimated one or more reservoir fluid geodynamic processes with the at least one measurement associated with the reservoir fluid; and output one or more reservoir fluid geodynamic processes corresponding to the at least one measurement associated with the reservoir fluid.

In another example, one or more tangible, non-transitory, machine-readable media including instructions to receive at least one measurement representative of a portion of a reservoir fluid as analyzed by a data acquisition tool in a wellbore in a geological formation within a hydrocarbon reservoir, to estimate at least one fluid component property by using an equation of state, and to simulate a diffusion process using a diffusion model that takes into account the at least one estimated fluid property. The diffusive model accounts for gravitational diffusion of at least one or more components in the reservoir fluid. The one or more tangible, non-transitory, machine-readable media also includes instructions to estimate one or more reservoir fluid geodynamic processes based at least in part on the at least one fluid property and to compare the one or more reservoir fluid geodynamic processes with the at least one measurement associated with the reservoir fluid.

In another example, a system, includes a downhole acquisition tool housing having a sensor that may measure at least one fluid property of a reservoir fluid within a geological formation of a hydrocarbon reservoir; and a data processing system that may identify reservoir fluid geodynamic processes within the geological formation based on the at least one fluid property of the reservoir fluid. The data processing system includes one or more tangible, non-transitory, machine-readable media having instructions to: estimate at least one fluid component property by using a suitable equation of state and simulate a diffusion process using a diffusion model that takes into account the at least one estimated fluid property. The diffusive model accounts for gravitational diffusion of at least one or more components in the reservoir fluid; estimate one or more reservoir fluid geodynamic processes based at least in part on the at least one fluid property; compare the one or more reservoir fluid geodynamic processes with the at least one measurement associated with the reservoir fluid; and output the one or more reservoir fluid geodynamic processes corresponding to the at least one measurement associated with the reservoir fluid.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
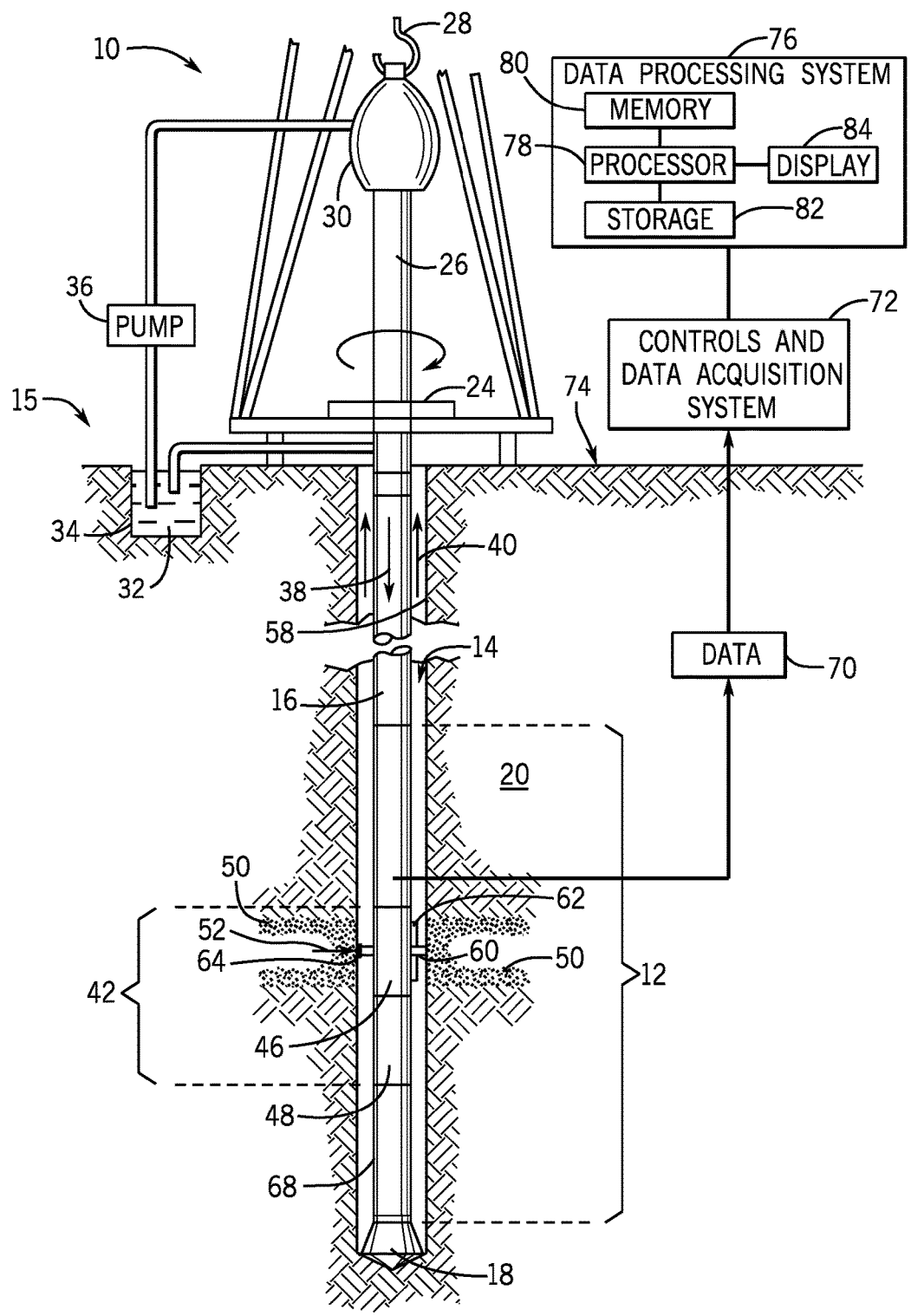
FIG. 1 is a schematic diagram of a wellsite system that may employ downhole fluid analysis for determining fluid gradients of a reservoir, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Acquisition and analysis representative of formation fluids downhole in delayed or real time may be use in reservoir modeling. A reservoir model based on downhole fluid analysis may predict or explain reservoir characteristics such as, but not limited to, connectivity, productivity, lifecycle stages, type and timing of hydrocarbon, hydrocarbon contamination, and reservoir fluid dynamics. Over the life of the reservoir, reservoir fluids such as oil, gas, condensates may behave dynamically in the reservoir. The reservoir fluids may flow (e.g., diffuse) into and out of the reservoir and/or biodegrade. This may result in spatial variations in the reservoir fluids throughout the reservoir, which may appear as fluid gradients in the composition characteristics of the reservoir fluids. For example, a concentration of compositional components of the reservoir fluid (e.g., gas, condensates, asphaltenes, etc.) may or may not vary along a vertical depth of the reservoir.

The variation or lack of variation in the concentration of these compositional components may indicate that the reservoir is in disequilibrium or equilibrium. In the case of disequilibrium, the reservoir may be understood to be undergoing—albeit over geologic time—one or more dynamic processes (e.g., changes in reservoir fluids occurring over geological time). In the case of equilibrium, the reservoir may be understood to have undergone one or more dynamic processes to achieve equilibrium. In either case, the dynamic processes may explain reservoir features that affect reservoir productivity by decreasing reservoir permeability due, in part, to the formation of tar mats and or bitumen deposits within the reservoir. Downhole fluid analysis (DFA) may be used to evaluate fluid behaviors (e.g., by identifying spatial variations) in reservoirs. Data generated from the DFA and/or data from additional sources, may be used to identify one or more dynamic processes that may be causing or have caused fluid gradients or a lack of fluid gradients within the reservoir. By way of example, some dynamic processes that may enable fluid gradients within the reservoir include biodegradation, continuous and/or discontinuous gas diffusion (e.g., gas and/or carbon dioxide ($CO_2$)), fault block migration, subsidence, convective currents, combinations of these, or any other suitable realization scenarios.

Diffusive and advective models may be used to model and describe field fluid geodynamics of a reservoir. In particular, equation of state (EOS) models that represent the fluid behavior of the reservoir fluids associated with dynamic processes may be used to predict how a fluid composition gradient may respond to various dynamic processes within the reservoir. Some EOS models are described in U.S. Pat. No. 8,271,248, which is assigned to Schlumberger Technology Corporation and is hereby incorporated by reference in its entirety for all purposes. For example, the EOS model may include cubic equilibrium EOS models, the Flory-Huggins-Zuo (FHZ) equation, and/or dynamic EOS models, which include the FHZ model and a diffusive or convection model associated with the dynamic processes (e.g., biodegradation, gas diffusion, convective currents, etc.). The equilibrium and dynamic EOS models may predict fluid interactions (e.g., gas-to-liquid and solid-to-liquid interactions) and compositions of the reservoir fluids through the reservoir by modeling factors such as, for example, gas-to-oil ratio (GOR), condensate-gas ratio (CGR), density, volumetric factors and compressibility, heat capacity, and saturation pressure.

Figure 2:
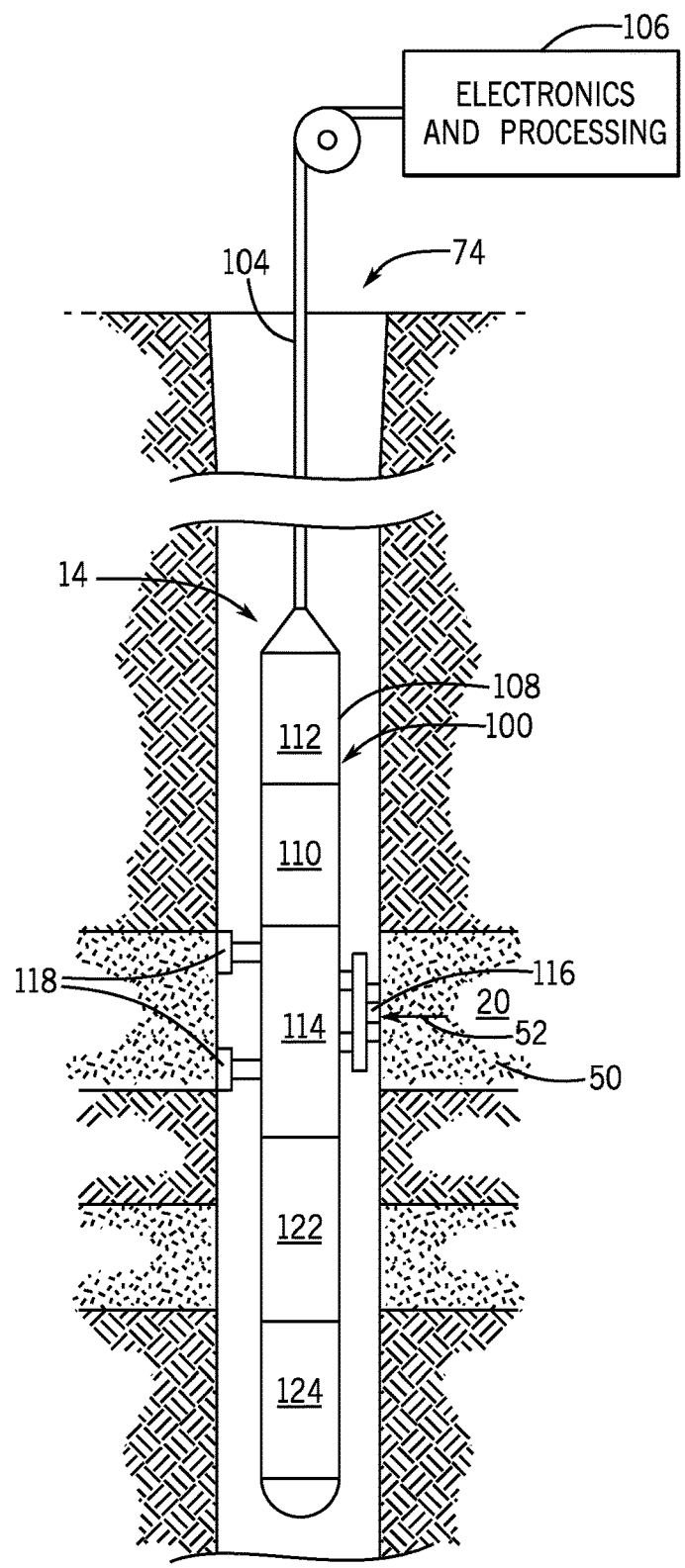
FIG. 2 is a schematic diagram of another embodiment of a wellsite system that may employ downhole fluid analysis methods for determining fluid properties and formation characteristics within a wellbore, in accordance with an embodiment.

FIGS. 1 and 2 depict examples of wellsite systems that may employ the fluid analysis systems and techniques described herein. FIG. 1 depicts a rig 10 with a downhole acquisition tool 12 suspended therefrom and into a wellbore 14 of a reservoir 15 via a drill string 16. The downhole acquisition tool 12 has a drill bit 18 at its lower end thereof that is used to advance the downhole acquisition tool 12 into geological formation 20 and form the wellbore 14. The drill string 16 is rotated by a rotary table 24, energized by means not shown, which engages a kelly 26 at the upper end of the drill string 16. The drill string 16 is suspended from a hook 28, attached to a traveling block (also not shown), through the kelly 26 and a rotary swivel 30 that permits rotation of the drill string 16 relative to the hook 28. The rig 10 is depicted as a land-based platform and derrick assembly used to form the wellbore 14 by rotary drilling. However, in other embodiments, the rig 10 may be an offshore platform.

Drilling fluid or mud 32 (e.g., oil base mud (OBM)) is stored in a pit 34 formed at the well site. A pump 36 delivers the drilling fluid 32 to the interior of the drill string 16 via a port in the swivel 30, inducing the drilling mud 32 to flow downwardly through the drill string 16 as indicated by a directional arrow 38. The drilling fluid exits the drill string 16 via ports in the drill bit 18, and then circulates upwardly through the region between the outside of the drill string 16 and the wall of the wellbore 14, called the annulus, as indicated by directional arrows 40. The drilling mud 32 lubricates the drill bit 18 and carries formation cuttings up to the surface as it is returned to the pit 34 for recirculation.

The downhole acquisition tool 12, sometimes referred to as a bottom hole assembly ("BHA"), may be positioned near the drill bit 18 and includes various components with capabilities, such as measuring, processing, and storing information, as well as communicating with the surface. A telemetry device (not shown) also may be provided for communicating with a surface unit (not shown). As should be noted, the downhole acquisition tool 12 may be conveyed on wired drill pipe, a combination of wired drill pipe and wireline, or other suitable types of conveyance.

In certain embodiments, the downhole acquisition tool 12 includes a downhole fluid analysis system. For example, the downhole acquisition tool 12 may include a sampling system 42 including a fluid communication module 46 and a sampling module 48. The modules may be housed in a drill collar for performing various formation evaluation functions, such as pressure testing and fluid sampling, among others. As shown in FIG. 1, the fluid communication module 46 is positioned adjacent the sampling module 48; however the position of the fluid communication module 46, as well as other modules, may vary in other embodiments. Additional devices, such as pumps, gauges, sensor, monitors or other devices usable in downhole sampling and/or testing also may be provided. The additional devices may be incorporated into modules 46, 48 or disposed within separate modules included within the sampling system 42.

The downhole acquisition tool 12 may evaluate fluid properties of reservoir fluid 50. Accordingly, the sampling system 42 may include sensors that may measure fluid properties such as gas-to-oil ratio (GOR), mass density, optical density (OD), composition of carbon dioxide ($CO_2$), $C_1$, $C_2$, $C_3$, $C_4$, $C_5$, and $C_{6+}$, formation volume factor, viscosity, resistivity, fluorescence, American Petroleum Institute (API) gravity, and combinations thereof of the reservoir fluid 50. The fluid communication module 46 includes a probe 60, which may be positioned in a stabilizer blade or rib 62. The probe 60 includes one or more inlets for receiving the formation fluid 52 and one or more flow lines (not shown) extending into the downhole acquisition tool 12 for passing fluids (e.g., the reservoir fluid 50) through the tool. In certain embodiments, the probe 60 may include a single inlet designed to direct the reservoir fluid 50 into a flowline within the downhole acquisition tool 12. Further, in other embodiments, the probe 60 may include multiple inlets that may, for example, be used for focused sampling. In these embodiments, the probe 60 may be connected to a sampling flow line, as well as to guard flow lines. The probe 60 may be movable between extended and retracted positions for selectively engaging the wellbore wall 58 of the wellbore 14 and acquiring fluid samples from the geological formation 20. One or more setting pistons 64 may be provided to assist in positioning the fluid communication device against the wellbore wall 58.

In certain embodiments, the downhole acquisition tool 12 includes a logging while drilling (LWD) module 68. The module 68 includes a radiation source that emits radiation (e.g., gamma rays) into the formation 20 to determine formation properties such as, e.g., lithology, density, formation geometry, reservoir boundaries, among others. The gamma rays interact with the formation through Compton scattering, which may attenuate the gamma rays. Sensors within the module 68 may detect the scattered gamma rays and determine the geological characteristics of the formation 20 based on the attenuated gamma rays.

The sensors within the downhole acquisition tool 12 may collect and transmit data 70 (e.g., log and/or DFA data) associated with the characteristics of the formation 20 and/or the fluid properties and the composition of the reservoir fluid 50 to a control and data acquisition system 72 at surface 74, where the data 70 may be stored and processed in a data processing system 76 of the control and data acquisition system 72.

The data processing system 76 may include a processor 78, memory 80, storage 82, and/or display 84. The memory 80 may include one or more tangible, non-transitory, machine readable media collectively storing one or more sets of instructions for operating the downhole acquisition tool 12, determining formation characteristics (e.g., geometry, connectivity, etc.) calculating and estimating fluid properties of the reservoir fluid 50, modeling the fluid behaviors using, e.g., equation of state models (EOS), and identifying dynamic processes within the reservoir that may be associated with observed fluid behaviors. The memory 80 may store reservoir modeling systems (e.g., geological process models, petroleum systems models, reservoir dynamics models, etc), mixing rules and models associated with compositional characteristics of the reservoir fluid 50, equation of state (EOS) models for equilibrium and dynamic fluid behaviors (e.g., biodegradation, gas/condensate charge into oil, $CO_2$ charge into oil, fault block migration/subsidence, convective currents, among others), and any other information that may be used to determine geological and fluid characteristics of the formation 20 and reservoir fluid 52, respectively. In certain embodiments, the data processing system 54 may apply filters to remove noise from the data 70.

To process the data 70, the processor 78 may execute instructions stored in the memory 80 and/or storage 82. For example, the instructions may cause the processor to compare the data 70 (e.g., from the logging while drilling and/or downhole fluid analysis) with known reservoir properties estimated using the reservoir modeling systems, use the data 70 as inputs for the reservoir modeling systems, and identify geological and reservoir fluid parameters that may be used for exploration and production of the reservoir. As such, the memory 80 and/or storage 82 of the data processing system 76 may be any suitable article of manufacture that can store the instructions. By way of example, the memory 80 and/or the storage 82 may be ROM memory, random-access memory (RAM), flash memory, an optical storage medium, or a hard disk drive. The display 84 may be any suitable electronic display that can display information (e.g., logs, tables, cross-plots, reservoir maps, etc.) relating to properties of the well/reservoir as measured by the downhole acquisition tool 12. It should be appreciated that, although the data processing system 76 is shown by way of example as being located at the surface 74, the data processing system 76 may be located in the downhole acquisition tool 12. In such embodiments, some of the data 70 may be processed and stored downhole (e.g., within the wellbore 12), while some of the data 70 may be sent to the surface 74 (e.g., in real time). In certain embodiments, the data processing system 76 may use information obtained from petroleum system modeling operations, ad hoc assertions from the operator, empirical historical data (e.g., case study reservoir data) in combination with or lieu of the data 70 to determine certain parameters of the reservoir 8.

FIG. 2 depicts an example of a wireline downhole tool 100 that may employ the systems and techniques described herein to determine formation and fluid property characteristics of the reservoir 8. The downhole tool 100 is suspended in the wellbore 14 from the lower end of a multi-conductor cable 104 that is spooled on a winch at the surface 74. Similar to the downhole acquisition tool 12, the wireline downhole tool 100 may be conveyed on wired drill pipe, a combination of wired drill pipe and wireline, or other suitable types of conveyance. The cable 104 is communicatively coupled to an electronics and processing system 106. The downhole tool 100 includes an elongated body 108 that houses modules 110, 112, 114, 122, and 124 that provide various functionalities including imaging, fluid sampling, fluid testing, operational control, and communication, among others. For example, the modules 110 and 112 may provide additional functionality such as fluid analysis, resistivity measurements, operational control, communications, coring, and/or imaging, among others.

As shown in FIG. 2, the module 114 is a fluid communication module 114 that has a selectively extendable probe 116 and backup pistons 118 that are arranged on opposite sides of the elongated body 108. The extendable probe 116 is configured to selectively seal off or isolate selected portions of the wall 58 of the wellbore 14 to fluidly couple to the adjacent geological formation 20 and/or to draw fluid samples from the geological formation 20. The probe 116 may include a single inlet or multiple inlets designed for guarded or focused sampling. The reservoir fluid 50 may be expelled to the wellbore through a port in the body 108 or the formation fluid 50 may be sent to one or more fluid sampling modules 122 and 124. The fluid sampling modules 122 and 124 may include sample chambers that store the reservoir fluid 50. In the illustrated example, the electronics and processing system 106 and/or a downhole control system are configured to control the extendable probe assembly 116 and/or the drawing of a fluid sample from the formation 20 to enable analysis of the fluid properties of the reservoir fluid 50, as discussed above.

Asphaltene analysis may be used to identify areas of instability in reservoirs. Gas charge into the reservoir 15 may cause asphaltene gravity currents due, in part, to an increase in solution gas (e.g., GOR) and asphaltene instability, depending on asphaltene phase stability boundary and rate of the gas charge. For example, if the rate of gas charge is high (e.g., between approximately 180 and approximately 5000 $Sm^3$ $m^{-2}MY^{-1}$, such as in gas-flood enhanced oil recovery (EOR)), the asphaltenes may undergo phase separation and deposit locally at certain positions within the reservoir 15 (e.g., positions where the asphaltene phase stability boundary is crossed). In contrast, if the rate of gas charge is slow (e.g., between approximately 0 and approximately 50 $Sm^3$ $m^{-2}MY^{-1}$), a diffusive flux of gas into the wellbore 14 (e.g., an oil column) may be comparable to a flux of gas into the reservoir including a gas cap and the wellbore 14. As such, migration of gas-to-oil contact (GOC) within the reservoir 15 and/or gas sweep of the oil (as in enhanced oil recovery (EOR)) may be blocked when gas charges are at a flank (e.g., side) of the reservoir 15. Accordingly, the asphaltenes may diffuse in the downward direction 38 due to both chemical potential and gravitational forces. Therefore, the asphaltenes move away from a high GOR location to a low GOR location.

Figure 3:
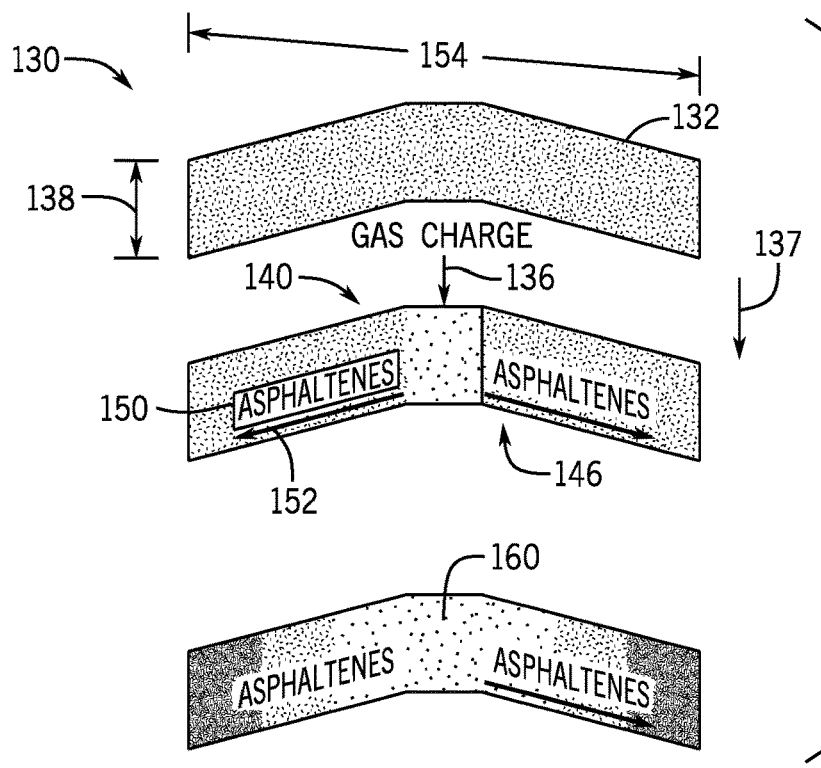
FIG. 3 is a diagram of an example of a reservoir undergoing vertical gas diffusion reservoir fluid geodynamic process, in accordance with an embodiment.
Figure 4:
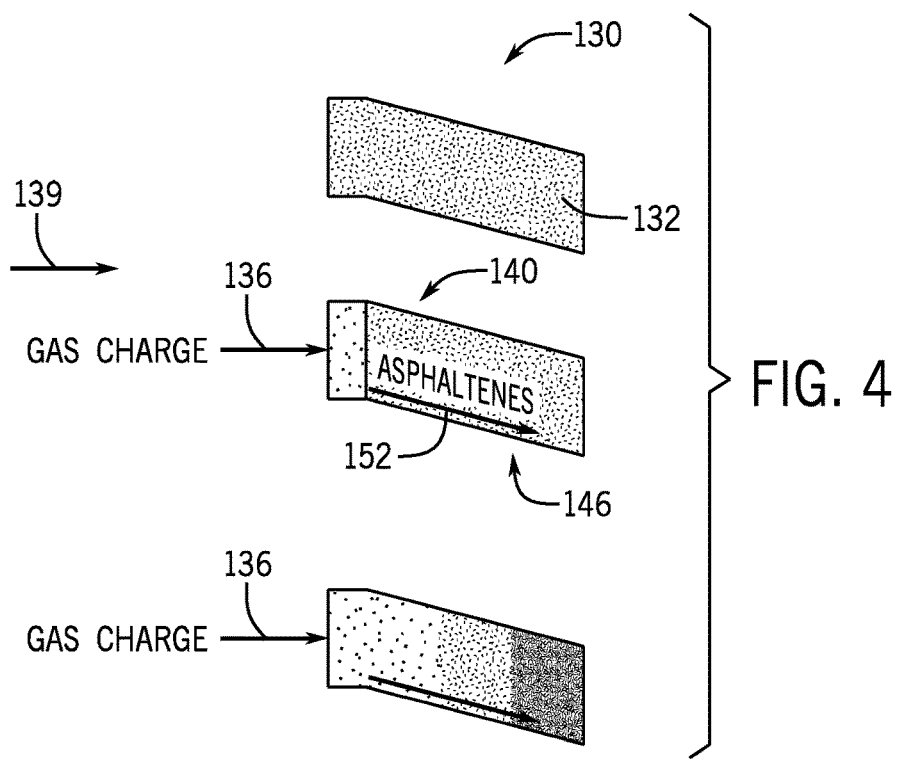
FIG. 4 is a diagram of an example of a reservoir undergoing a lateral sweeping gas diffusion reservoir fluid geodynamic process, in accordance with an embodiment.

As discussed above, the data 70 from the downhole tool 100 may be analyzed with the equation of state (EOS) models to determine how gradients in reservoir fluid compositions respond to various dynamic processes occurring within the reservoir 8. The dynamic processes for the reservoir 8 may include gas/condensate charge, biodegradation, convective currents, fault block migration, asphaltene gravity currents, and subsidence, among others. The rate of gas charge into crude oil columns may form asphaltene gravity currents that may be measured to determine fluid geodynamics of the reservoir. FIGS. 3 and 4 illustrate an embodiment of gas charge scenarios that may be present in a reservoir 130 having a rate of gas charge such that the reservoir 130 has substantially no migration of the gas-to-oil contact (GOC) and/or gas sweep of oil (e.g., in enhanced oil recovery (EOR)). Moving from top to bottom, the diagrams in FIGS. 3 and 4 illustrate the reservoir 130 saturated with immature oil 132 (e.g., black oil) and charged with gas 136. For example, in FIG. 3, the gas 136 charges into the immature oil 132 from a vertical direction 137. In contrast, in FIG. 4, the gas 136 charges into the immature oil 132 from a lateral (e.g., side) direction 139 through fault planes of the reservoir 130. The immature oil 132, also known as heavy/black oil, generally has a high concentration of high molecular weight hydrocarbons (e.g., asphaltenes, resins, $C_{60+}$) compared to mature oil (e.g., light oil, gas), which has high concentrations of low molecular weight aliphatic hydrocarbons (e.g., methane ($CH_4$), ethane ($C_2H_6$), propane ($C_3H_8$), $C_4$, $C_5$, $C_{6+}$ etc.). The longer the reservoir fluid (e.g., the reservoir fluid 50) is within the formation 20, certain high molecular weight hydrocarbons found in the immature oil 132 may breakdown into the low molecular weight aliphatic hydrocarbons that make up the mature/light oil. Additionally, over time, source rock (e.g., portion of the formation 20 having hydrocarbon reserve) may be buried under several layers of sediment. As the sediment layers increase, a depth 138 of the source rock, reservoir temperature, and reservoir pressure also increase. The increased temperatures and pressures favor the generation of light hydrocarbons which may enter the reservoir.

Over time, the low molecular weight aliphatic hydrocarbons (e.g., gas 136) may be expelled from the source rock and travel through a high-permeability streak in the formation to the top of the reservoir unit. As shown in the middle diagram in FIG. 3, the gas 136 diffuses down into the reservoir 130 from top 140 to bottom 146, thereby charging the immature oil 132 with the gas 136. Late charge of the gas 136 (e.g., diffusion of gas after the reservoir 130 has been saturated with immature oil) into the immature oil 132 destablizes the reservoir 130, resulting in a fluid gradient for several fluid properties of the immature oil 132. A similar fluid gradient for several fluid properties of the immature oil 132 may be achieved when the late charge of gas 136 is from the lateral direction 139, as shown in the middle diagram of FIG. 4. For example, the late charge of the gas 136 may cause fluid gradients in API gravity, gas-to-oil ratio (GOR), saturation pressure (Psat), and combinations thereof of the immature oil 132. Asphaltenes 150 in the reservoir 130 are generally insoluble in the gas 136. Therefore, increased concentration of the gas 136 toward the top 140 of the reservoir 130 may cause the asphaltenes 150 to phase separate. Based on a diffusive mobility of the gas 136 in the reservoir 130 and a negative buoyancy force for asphaltenes 150, the asphaltenes 150 may move away from the gas 136, as shown by arrow 152. As such, the asphaltenes 150 accumulate locally at the bottom 146 of the reservoir 130 (e.g., above base sealing rocks near a front of the gas 136).

The depth 138 of the reservoir 130 is generally less than a lateral distance 154 of the reservoir 130. For example, the depth 138 may be 10%, 20%, 50%, or more less than the lateral distance 154. Therefore, continued gas diffusion may facilitate local accumulation of the asphaltenes 150. Local accumulation of the asphaltenes 150 in the reservoir 130 may result in a local increase in asphaltene content compared to the asphaltene content in the same local regions of the immature oil 132. Accordingly, oil density at certain localized regions of the reservoir 130 may be higher than an oil density of the immature oil 132. The oil density inversion may create convection, which may lead to gravity currents convection, as illustrated in the middle diagrams of FIGS. 3 and 4.

The density inversion and gravity currents convection may accelerate migration of the asphaltenes 150 toward the bottom 146 of the reservoir 130 over geological time. Therefore, as the gas 136 continues to diffuse through the reservoir 130, the asphaltenes 150 accumulate locally at the bottom 146 of the reservoir 130, as shown in the bottom diagram of FIGS. 3 and 4. The asphaltenes 150 accumulated at the bottom 146 of the reservoir 130 may result in local increases in asphaltene content compared to that of the immature oil 132. In addition, in certain embodiments, the asphaltenes 150 may flocculate at the locations where the asphaltenes 150 are thermodynamically unstable at any geological time.

Diffusion of the asphaltenes 150 ahead of the gas front may yield mass density inversions and gravity currents (convective currents), which may result in bitumen deposition upstructure and/or tar mats at the bottom 146 of the reservoir 130. For example, a flow of asphaltenes 150 to the bottom 146 may lead to a low concentration of asphaltenes 150 toward the top 140 compared to a concentration of asphaltenes 150 toward the bottom 146, resulting in a concentration gradient for the asphaltenes 150 in the reservoir 130.

Existing diffusive models developed for modeling fluid geodynamics in field reservoirs (e.g., the reservoir 8, 130) do not account for gravitational forces, which may result in undesirable offsets in the data when determining compositional characteristics of the sampled reservoir fluid 52. Therefore, disclosed herein are one and three-dimensional diffusive models that may be used to model the fluid geodynamics of the reservoir 8 using the data acquisition tool 12. A three-dimensional (3-D) governing equation for the molar conservation equation of each component for an N-component mixture may be expressed as follows:

$$\frac{\partial C_i}{\partial t} + \nabla \cdot (C_i u + J_i) = 0, \qquad (1)$$
$$i = 1, 2, \ldots, N$$

where $C_i$ is a molarity (molar concentration) of component i, t is time, u is a molar averaged velocity vector, $J_i$ is a molar diffusive flux vector of component i, and $\nabla \cdot$ is the divergence operator. Therefore, a total molar conservation of the N-component mixture (e.g., the reservoir fluid 50) may be expressed as follows:

$$\frac{\partial C_t}{\partial t} + \nabla \cdot (C_t u) = 0, \quad \text{with } \sum J_i = 0 \tag{2}$$

where $C_t$ is the total molar concentration of the reservoir fluid 50 in the downhole acquisition tool 12.

The molar averaged velocity vector (u) may be estimated by Darcy's law, expressed as follows:

$$u = -\frac{k}{\eta}(\nabla P - \rho g) \tag{3}$$

where k, η, P, ρ, and g denote permeability, fluid viscosity, pressure, mass density, and gravity vector, respectively, and ∇ is a gradient operator. While Darcy's law is generally used as the mass averaged velocity, it may also be used as the molar averaged velocity expressed above in equation 3.

As discussed above, existing diffusive models do not account for gravitational forces of the components within the reservoir fluid 50 (e.g., N-component mixture). However, there may be a large offset within the reservoir 8 due, in part, to the gravitation forces acting on the components. Therefore, to increase the accuracy of the diffusive model for fluid geodynamic modeling of the reservoir 8, the diffusive model disclosed herein accounts for gravitational parameters of the N-component mixture. For example, the disclosed diffusive model includes an extended Maxwell-Stefan equation having a gravity term, which is expressed as follows:

$$d_i = -\frac{x_i}{RT}\nabla_T \mu_i + \frac{x_i}{RT}M_i g = \sum_{\substack{j=1 \\ j \neq i}}^{N} \frac{x_j J_i - x_i J_j}{C_t D_{ij}}, \tag{4}$$

$$i = 1, 2, \ldots, N$$

where

R, T, $d_i$, g, $x_i$, $M_i$, and, $\mu_i$ are the universal gas constant, temperature, driving force vector, gravitational accelerations, mole fraction, molar mass, and chemical potential, respectively, and the subscript i represents component i in the N-component mixture (e.g., the reservoir fluid 50). $D_{ij}$ is the Maxwell-Stefan diffusivity between component i and component j, respectively, and $\nabla_T$ is the gradient at isothermal conditions.

According to thermodynamics, chemical potential at isothermal conditions is expressed as follows:

$$\nabla_T \mu_i = \nabla_{T,P} \mu_i + \overline{V}_i \nabla P \tag{5}$$

where $\overline{V}_i$ and P are the partial molar volume of component i and the pressure, and $\nabla_{T,P}$ is the gradient at isothermal and isobaric conditions. The gravity vector (g) is generally effective in the vertical direction, whereas its horizontal effect is generally zero. However, if the reservoir 8 reaches mechanical equilibrium, the following expression may be obtained:

$$\nabla P = \rho g \tag{6}$$

where ρ is the mass density.

Equations 5 and 6, discussed above, may be substituted into the extended Maxwell-Stefan equation 4 to yield the following:

$$d_i = -\frac{x_i}{RT}\nabla_{T,P}\mu_i - \frac{x_i}{RT}\left(\overline{V}_i - \frac{M_i}{\rho}\right)\rho g = \tag{7}$$

$$-\sum_{j=1}^{N-1} \Gamma_{ij} \nabla x_j - \frac{x_i \overline{V}_i \Delta \rho g}{RT} = \sum_{\substack{j=1 \\ j \neq i}}^{N} \frac{x_j J_i - x_i J_j}{C_t D_{ij}},$$

where where $\Delta \rho = \rho - \rho_i$, and $\rho_i$ is the mass density (mass concentration) of a component i in the N-component mixture. The thermodynamic nonideality of the N-component mixture may be computed by using derivatives of the activity coefficients (or fugacity coefficients) associated with the component i, which is expressed as follows:

$$\Gamma_{ij} = \Delta_{ij} + x_i \frac{\partial \ln \gamma_i}{\partial x_j} \quad i, j = 1, 2, \ldots, N-1 \tag{8}$$

where $\Delta_{ij}$ is the Kronecker delta function and γ denotes the activity coefficient discussed in further detail below. In certain embodiments, γ may be replaced by the fugacity coefficient, which may be estimated from an equation of state (EOS).

Equation 7 above may be rearranged and expressed as follows:

$$C_t d_i = -C_t \sum_{j=1}^{N-1} \Gamma_{ij} \nabla x_j - C_t \frac{x_i \overline{V}_i \Delta \rho g}{RT} = \sum_{\substack{j=1 \\ j \neq i}}^{N} \frac{x_j J_i - x_i J_j}{D_{ij}} \tag{9}$$

To obtain the molar flux vector, equation 9 above may be rearranged and expressed as follows:

$$J = -C_t[B]^{-1}[\Gamma]\nabla x - C_t[B]^{-1}\frac{x_i \overline{V}_i \Delta \rho g}{RT} \tag{10}$$

where the [Γ] matrix is estimated by equation. 8 and the [B] matrix of the drag effects is given by the Maxwell-Stefan diffusivities expressed as follows:

$$B_{ii} = \frac{x_i}{D_{iN}} + \sum_{\substack{k=1 \\ k \neq i}}^{N} \frac{x_k}{D_{ik}}, \tag{11}$$

$$B_{ij(i \neq j)} = x_i\left(\frac{1}{D_{iN}} - \frac{1}{D_{ij}}\right), i, j = 1, 2, \ldots, N-1$$

While the present disclosure utilized Maxwell-Stefan diffusivities, any other suitable diffusion may also be used. For example, in certain embodiments, Fick's diffusion may be used in a manner similar to that of the Maxwell-Stefan diffusivities.

Figure 5:
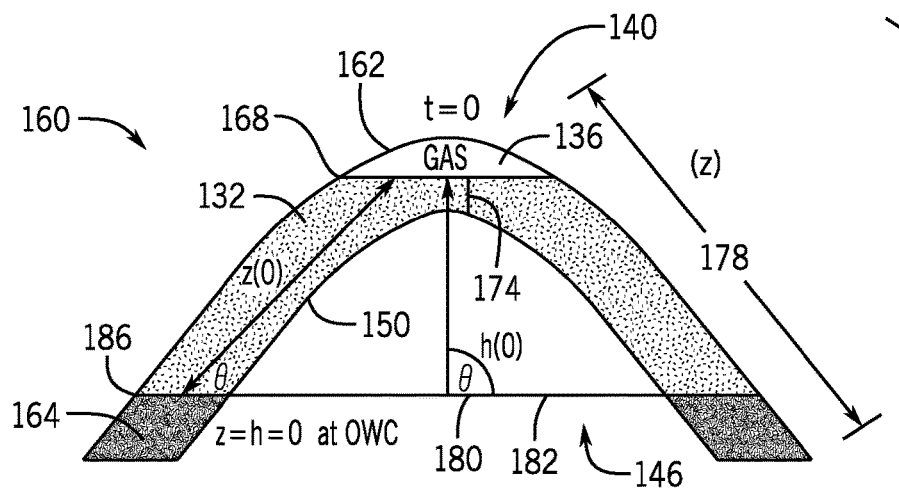
FIG. 5 is a diagram of an example of an anticline reservoir undergoing gas diffusion, in accordance with an embodiment.
Figure 5:
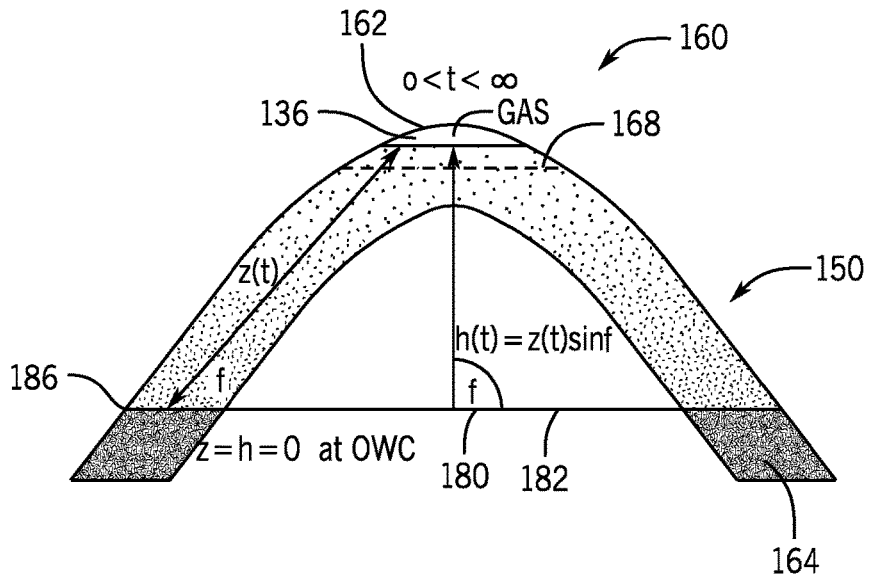

As discussed above, a late charge of the gas 136 into the reservoir 8, 130 may increase solution gas (e.g., gas-to-oil ratio (GOR)) and asphaltene instability, depending on the asphaltene stability boundary and the rate of the gas charge. FIG. 5 illustrates a on-dimensional (1-D) multicomponent anticline reservoir 160. The anticline reservoir 160 includes a gas cap 162 (or a light hydrocarbon column) is at the top 140 of the anticline reservoir 160, and an aquifer 164 is at the bottom 146. For the purpose of this disclosure, the aquifer 164 is assumed to be incompressible and impermeable for diffusion of hydrocarbon components. Additionally, it is assumed that the gas cap 162 is pure gas 136 and that the asphaltenes 150 in the immature oil 132 cannot move into the gas cap 162 because the gas 136 does not have sufficient solvency to dissolve the asphaltenes 150. At a gas/oil contact (GOC) 168, the gas 136 and the immature oil 132 are assumed to be in equilibrium. Late charge of gas into the anticline reservoir 160 may result in a decrease in gas cap volume and an increase in volume of the immature oil 132 in the reservoir 160 (e.g., oil column) the reservoir 160 may have undesirable moving boundary diffusion. However, if both the gas 136 and the immature oil 132 are considered simultaneously, the boundary conditions are impermeable for all components in the N-component mixture. That is, the boundary between the immature oil 132 and the gas 135 does not move.

The anticline reservoir 160 includes a vertical depth 174 (e.g., height, h), a diffusion path 178 (z) (or incline distance), and a dip angle 180 (θ). The vertical depth 174 (h) and a lateral distance 182 (l) of the anticline reservoir 160 may be obtained by the following equations:

$$h = \sin(\theta)(z) \quad (12)$$

$$l = \cos(\theta)(z) \quad (13)$$

For lateral diffusion (see, e.g., FIG. 3), the gravity force may be omitted and existing diffusive models may be used to model diffusion fluid geodynamics of the reservoir 160.

Moving from top to bottom, the diagrams in FIG. 5, illustrates homogenous initial conditions (e.g., before charge of the gas 136) of the reservoir 160 (e.g., top diagram) at time t=0, and late gas charge conditions (e.g., bottom diagram) at any time t of diffusion of the gas 136 through the reservoir 160. As discussed above, during late gas charge the gas/oil contact (GOC) moves up, and the asphaltenes 150 migrate down, as shown in the bottom diagram of FIG. 5.

It may be desirable to simplify the diffusive model equations to facilitate modeling of diffusion fluid geodynamics in the reservoir 8. Accordingly, the 3-D diffusive model discussed above may be rewritten as a 1-D diffusive model by removing the advection term $C_i u$. The simplified 1-D diffusive model is expressed as follows:

$$\frac{\partial C_i}{\partial t} + \nabla \cdot (J_i) = 0, \; i = 1, 2, \ldots, N \quad (14)$$

For the purpose of the present disclosure, it is assumed that the partial molar volume for each component is constant. Accordingly, the molarity (e.g., molar concentration) may be converted to mole fraction by using the following expressions:

$$x_i = \quad (15)$$

$$C_i V = \frac{C_i V \overline{V}_N}{\overline{V}_N} = \frac{C_i V \overline{V}_N}{V - \sum_{k=1}^{N-1} x_k (\overline{V}_k - \overline{V}_N)} = \frac{C_i \overline{V}_N}{1 - \sum_{k=1}^{N-1} C_k (\overline{V}_k - \overline{V}_N)}$$

where $$V = \sum_{k=1}^{N} x_k \overline{V}_k = \sum_{k=1}^{N-1} x_k (\overline{V}_k - \overline{V}_N) + \overline{V}_N \quad (16)$$

Accounting for the dip angle 180, the molar flux vector at isothermal conditions (e.g., equation 10) discussed above, may be expressed as follows:

$$J = J^{mol} + J^{grav} = -C_t [B]^{-1} [\Gamma] \nabla x - C_t [B]^{-1} \frac{x_i \overline{V}_i \Delta \rho g \sin(\theta)}{RT} \quad (17)$$

The first term of equation 17 is the molecular diffusion flux which is the same term found in existing diffusive models. However, the second term of equation 17 is the gravitational diffusion flux, which is negligible in a horizontal direction (e.g., θ=0). The asphaltenes 150 in the reservoir 8 may have different forms during late charges of the gas 136 or light hydrocarbon. For examples, the asphaltenes 150 may often be dispersed in the immature oil 132 as nanoaggregate. However, late charge of the gas 136 may result in a change in asphaltene concentrations in some locations due, in part, to a decrease the solvency ability of the immature oil 132 to dissolve the asphaltenes 150. In this case, a portion of the asphaltenes 150 form asphaltene clusters suspended in the immature oil 132, thereby forming colloidal solution. However, asphaltene clusters are much bigger than nanoaggregates and their gravitational diffusion rate is also faster than nanoaggregates Therefore, it may be desirable to modify the gravitational diffusion term in of equation 17.

For example, the asphaltenes 150 may be divided nanoaggregates and clusters (which generally have fractions of $(1-\varphi_{clusters})$ and $\varphi_{clusters}$), respectively. For simplicity, molar asphaltene flux may also be divided into two parts: a contribution of nanoaggregates which is estimated by the Maxwell-Stefan gravitational diffusion in equation (17) and a contribution of clusters which is directly estimated by the simplified Stokes law.

Therefore, equation 17 is expressed as follows:

$$J_a^{grav} = -C_t [B]^{-1} \frac{x_a \overline{V}_a \Delta \rho g \sin(\theta)}{RT} (1 - \varphi_{clusters}) + C_t x_a u_{clusters} \varphi_{clusters} \quad (18)$$

where $\overline{V}_a$ is the molar volume of nanoaggregates and subscript a denotes the term for the asphaltenes 150. It should be noted that asphaltene density may be unchanged for all forms of the asphaltene 150. The Stokes settlement velocity is calculated by Stokes' law:

$$u_{clusters} = \frac{1}{18\eta} g d_{clusters}^2 (\rho_a - \rho) \sin(\theta) \quad (19)$$

where

η is the viscosity of the reservoir fluid and $d_{clusters}$ is the average particle diameter of asphaltene clusters. However, other settlement velocity expressions may also be used.

To solve the aforementioned differential equations, it is desirable to know the initial and boundary conditions. The initial and boundary conditions may be based on the fluid geodynamic process occurring during measurement and, therefore, may be set differently. If the gas cap is omitted in diffusion simulation, the initial and boundary conditions are the equivalent to those in existing models. However, if both the gas cap (light oil column) and oil column (e.g., wellbore 14) are used simultaneously in diffusion simulations, the following initial and boundary conditions are assigned. Initial conditions are set to be homogeneous or heterogeneous compositions in the gas cap (or light oil column) and oil column, and expressed as follows:

$$C_i(0,z) = C_{i\_oil}^0, \ z \leq Z_{oil}, \ i=1,2,\ldots,N$$

$$C_i(0,z) = C_{i\_gas}^0, \ z > Z_{oil}, \ i=1,2,\ldots,N \tag{20}$$

where $Z_{oil}$ the 1-D distance of the initial oil column.

At the base of the oil column (z=0), which is generally at oil/water contact (OWC) 186, the following impermeable boundary conditions may be applied:

$$\frac{\partial C_i(t,0)}{\partial z} = 0, \ i=1,2,\ldots,N \tag{21}$$

Additionally, for other components of the N-component mixture, the following impermeable boundary conditions may be applied at the base of the oil column (e.g., z=0). For example, asphaltene-out-flux) may be applied to simulate asphaltenes knocked out to form tar in rocks.

$$\frac{\partial C_i(t,0)}{\partial z} = const \tag{22}$$

In certain embodiments, an asphaltene reaction at the base of the oil column (e.g., z=0) may be considered to represent asphaltene deposition if asphaltene phase instability occurring at the base of the oil column is known. As such, different boundary conditions for asphaltene component at the base of the oil column (e.g., z=0) may be used.

A ternary mixture of gas, asphaltenes and maltene may be taken as an example. In the gas cap 162, pure methane ($CH_4$) or a pseudo-gas component may be assumed. The gas cap may be replaced by mature oil (light oil).

For the boundary conditions at the top 140 of the gas cap 162 (or light oil column, $z=Z_{top}$), impermeable diffusion boundary conditions are also applied because of top sealing rocks $$\frac{\partial C_i(t, Z_{top})}{\partial z} = 0, \ i=1,2,\ldots,N \tag{22}$$

For boundary conditions in which the gas 136 has a fixed in-flux, the following equation may be applied:

$$\frac{\partial C_i(t, Z_{top})}{\partial z} = const \tag{23}$$

However, other boundary conditions may also be used at the top of the reservoir.

For light hydrocarbon lateral sweep, equation 23 may sometimes be inaccurate. For example, if an amount of the gas 136 (or light hydrocarbon) charges is low, the gas cap 168 may not be formed. In this case, gas component can be assumed to be a constant influx. Asphaltene content can be a small fixed value.

Gas addition into the oil column (e.g., the reservoir 160) may result in swelling and may move the gas/oil contact (GOC) 186 up, the GOC changes may be estimated by the following:

$$z = z^0 + \int_0^t \frac{J_1^{GOC}}{C_1^{GOC-O} - C_1^{GOC-G}} dt \tag{24}$$

where $z^0$ is the initial depth of the GOC, and $J_1$ and $C_1$ are the gas flux and molar concentration at the GOC. The terms G and O denote the gas and oil sides.

Initial and boundary conditions may be set differently according to actual scenarios in the reservoir 8. Combining the equations above with initial and boundary conditions, composition variations occurring over time in the reservoir 8 may be calculated numerically. The calculation may be conducted for solving the partial differential equations mentioned above.

As discussed above, the diffusive model disclosed herein uses an activity coefficient model to describe non-ideality in different phases. The activity coefficient is may be calculated by the Flory-Huggins regular solution model expressed as follows:

$$\ln \gamma_i = \ln \frac{\overline{V}_i}{V} + 1 - \frac{\overline{V}_i}{V} + \tag{25}$$

$$\frac{\overline{V}_i}{RT} \sum_{j=1}^{N} \sum_{k}^{N} \phi_j \phi_k [(\delta_i - \delta_j)^2 + 2l_{ij}\delta_i\delta_j - 0.5(\delta_j - \delta_k)^2 - l_{jk}\delta_j\delta_k]$$

where

δ is the solubility parameter and $l_{jk}$ is the binary interaction parameter between components j and k. For pure component j, $l_{jj}=0$. If $l_jk=0$, equation 25 may be reduced and expressed as follows:

$$\ln \gamma_i = \ln \frac{\overline{V}_i}{V} + 1 - \frac{\overline{V}_i}{V} + \frac{\overline{V}_i(\delta_i - \delta)^2}{RT} \tag{26}$$

$$\delta = \sum_{i=1}^{N} \phi_k \delta_k \tag{27}$$

$$\phi_i = \frac{x_i \overline{V}_i}{\sum_{i=1}^{N} x_k \overline{V}_i} \tag{28}$$

It should be noted that other activity coefficient models may be used to estimate non-ideality. In addition, an equation of state (EOS) approach may also be used. In this particular case, the activity coefficient is replaced by the fugacity coefficient, which is calculated by an EOS.

If the system reaches thermodynamic equilibrium (or stationary state), the following exist $$\nabla J_i = 0, i = 1, 2, \ldots, N \quad (29)$$

$$\frac{1}{RT}\nabla_{T,P}\mu_i - \frac{1}{RT}\left(\overline{V}_i - \frac{M_i}{\rho}\right)\nabla P = \nabla_{T,P}\ln x_i \gamma_i + \left(\frac{\overline{V}_i \rho g \nabla z \sin(\theta)}{RT}\right) = 0 \quad (30)$$

Assuming that the reservoir fluid 50 includes two pseudo-components (asphaltene and maltene), equation 30 may be combined with equation 26 for the activity coefficients, and reduced to the Flory-Huggins-Zuo EOS for asphaltene gradients in hydrocarbon reservoirs.

$$\frac{OD_{h_2}}{OD_{h_1}} = \quad (31)$$

$$\frac{\phi_{h_2}}{\phi_{h_1}} = \exp\left\{\frac{\overline{V}_a g(\rho - \rho_a)(h_2 - h_1)}{RT} + \frac{\overline{V}_a}{RT}\left[(\delta_a - )_{h_1}^2 - (\delta_a - \delta)_{h_2}^2\right] + \left[\left(\frac{\overline{V}_a}{\overline{V}}\right)_{h_2} - \left(\frac{\overline{V}_a}{\overline{V}}\right)_{h_1}\right]\right\}$$

where

OD, R, $\phi$, $v$, $\delta$, T, g, $\rho$, and h are the optical density, universal gas constant, volume fraction, molar volume, solubility parameter, temperature, gravitational acceleration, density and vertical depth (h=sin($\theta$)z), respectively. The subscript a denotes the properties of asphaltenes; subscripts $h_1$ and $h_2$ stand for the properties at vertical depths $h_1$ and $h_2$, respectively. It should be pointed out that the solubility parameter, molar volume, and density of bulk fluids, temperature, pressure and compositions are dependent on the vertical depth 174 of the reservoir 8.

Figure 6:
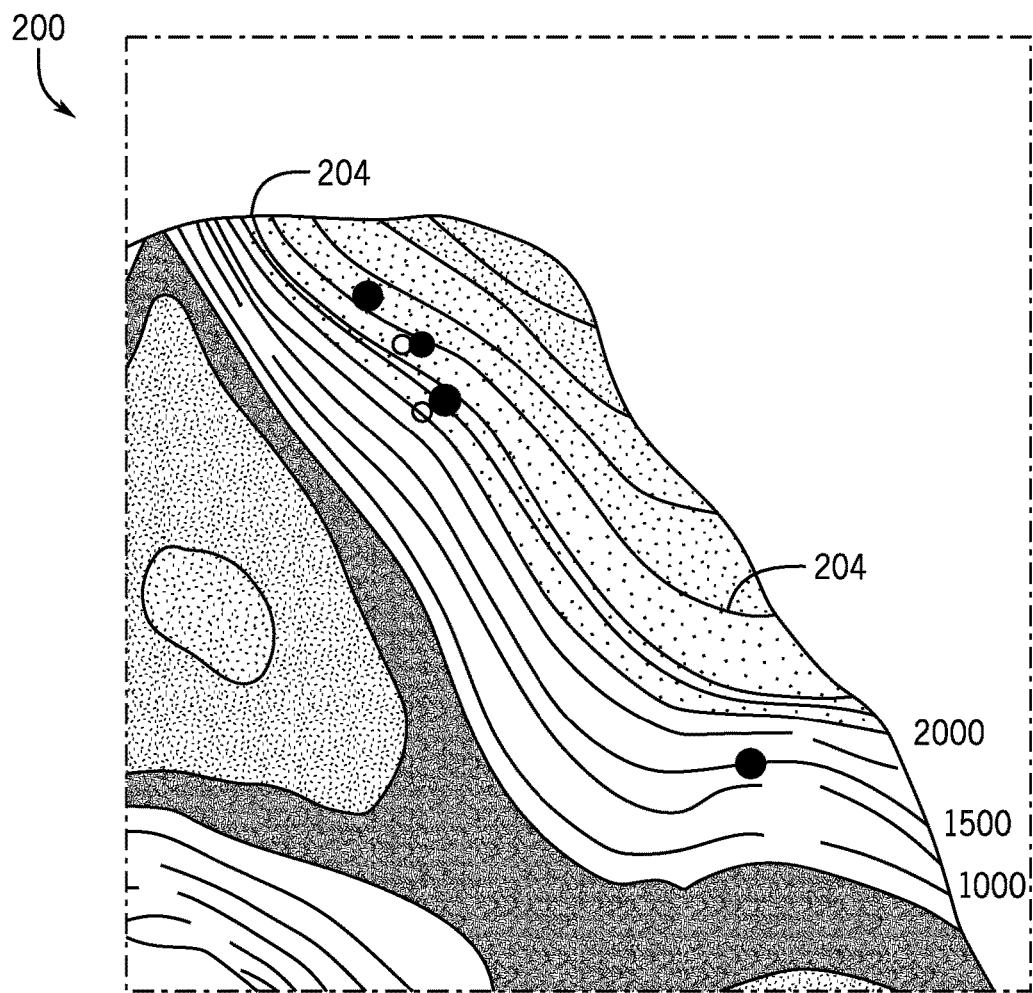
FIG. 6 is cross-sectional view of a field map of an example reservoir, in accordance with an embodiment.

FIG. 6 is a diagram representative of a field map 200 of top structures with superposed gas-to-oil ratio (GOR) contour lines. A critical fluid line 204 shows GOR of about 2200 scf/bbl. A number of exploration, appraisal, and development wells may be drilled across the reservoir 8. In the illustrated embodiment, a large GOR gradient was detected in the fluid column (e.g., wellbore 14). The upper portion is rich gas condensate whereas the lower portion is low-GOR oil. The fluid is a critical fluid between the gas and oil transition and there is does not appear to be gas/oil contact (GOC). The critical fluid has a GOR of approximately 2200 scf/bbl. In this particular case, the late gas charge may result in formation of asphaltene clusters, which fall at the Stokes settlement velocity in equations 18 and 19 above.

Figure 7:
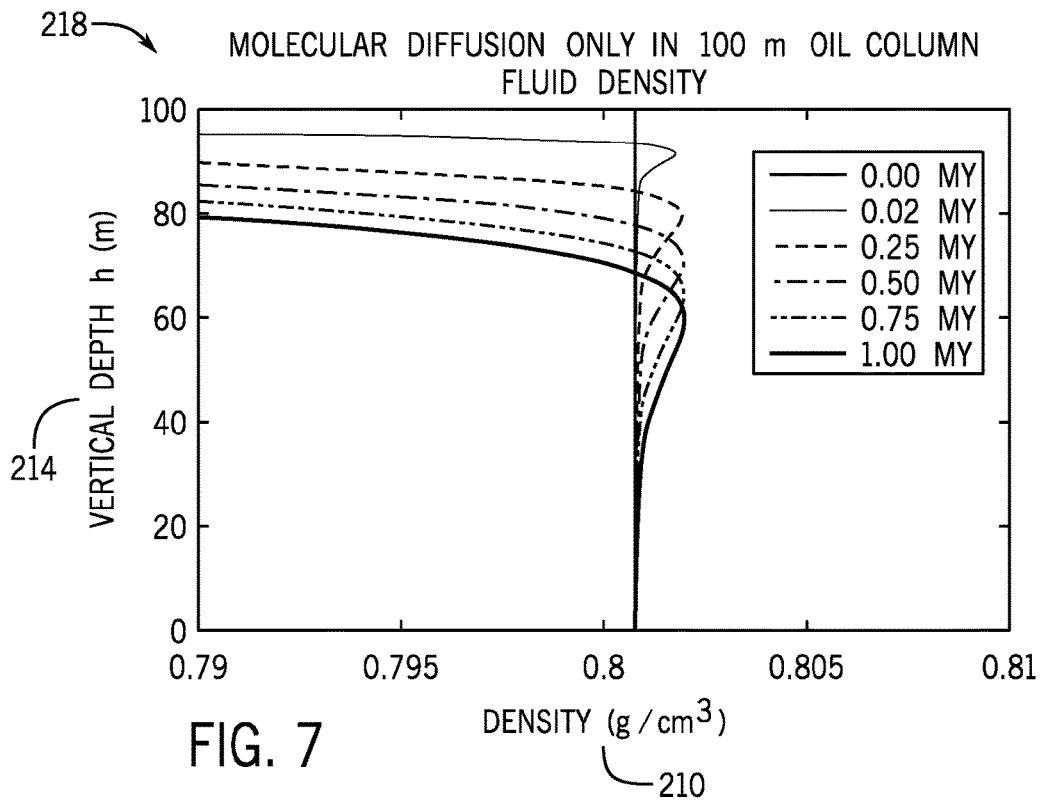
FIG. 7 is a representative plot of density as a function of vertical depth for a reservoir undergoing a gas diffusion reservoir fluid geodynamic process simulated using a diffusive model that does not include gravitational diffusion, in accordance with an embodiment.
Figure 8:
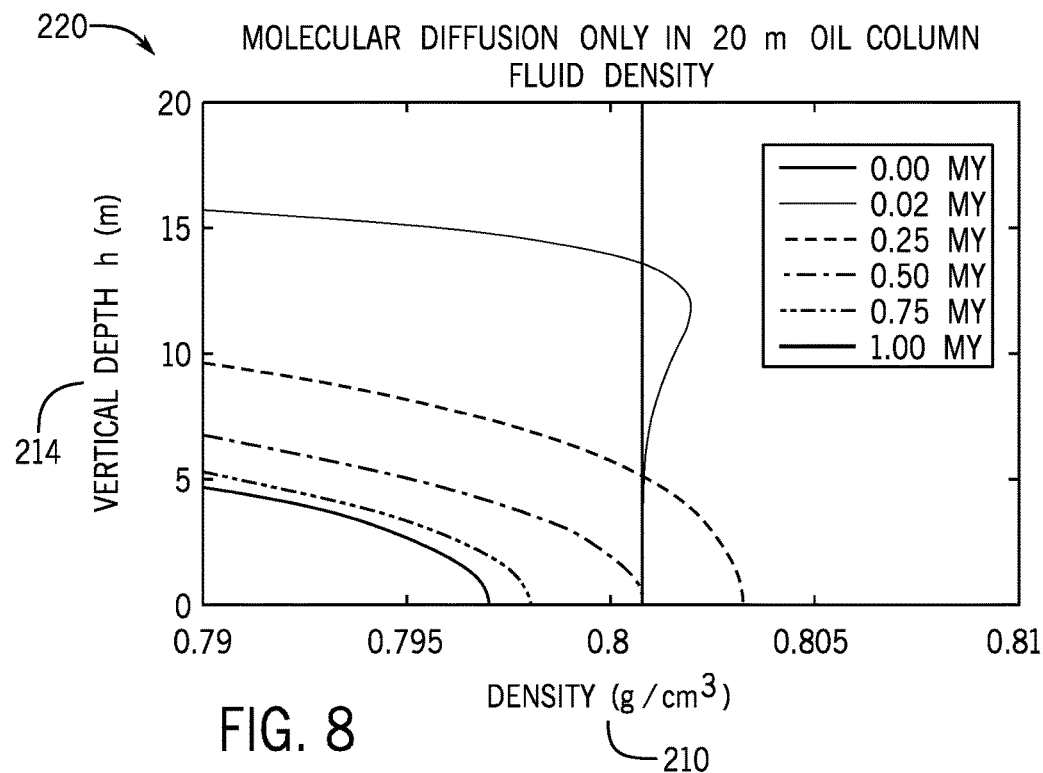
FIG. 8 is a representative plot of density as a function of vertical depth for a reservoir undergoing a gas diffusion reservoir fluid geodynamic process simulated using a diffusive model that does not include gravitational diffusion, in accordance with an embodiment.
Figure 9:
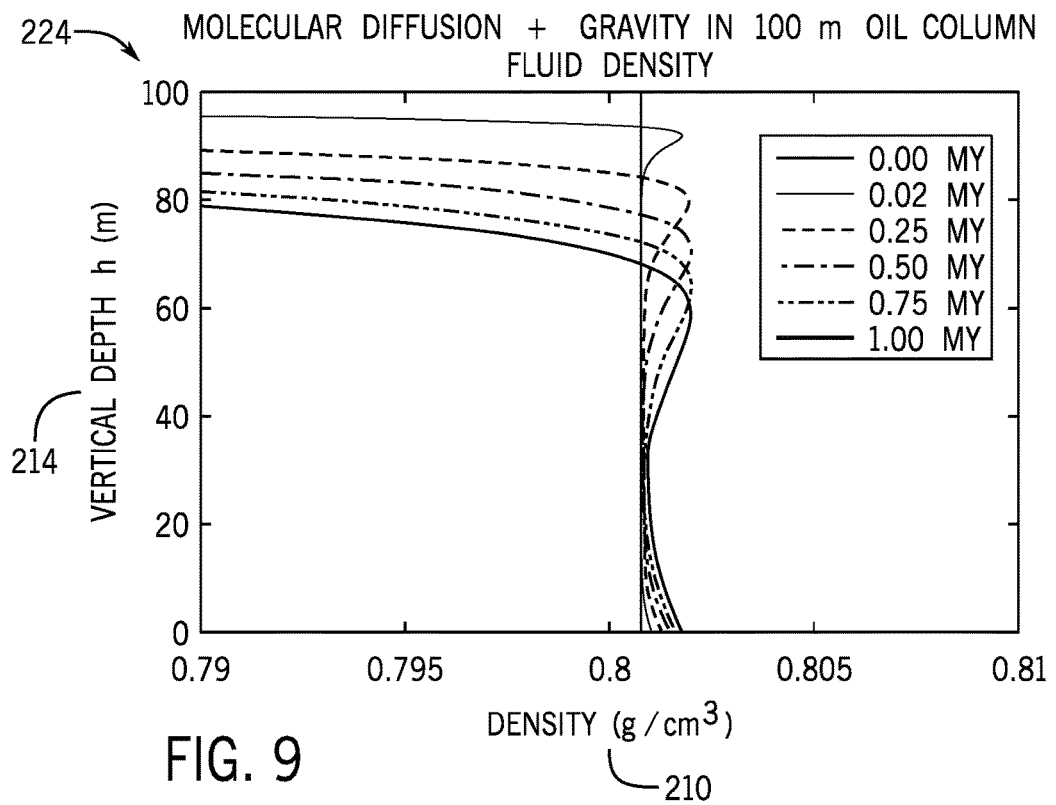
FIG. 9 is a representative plot of density as a function of vertical depth for a reservoir undergoing a gas diffusion reservoir fluid geodynamic process simulated using a diffusive model that includes gravitational diffusion, in accordance with an embodiment.
Figure 10:
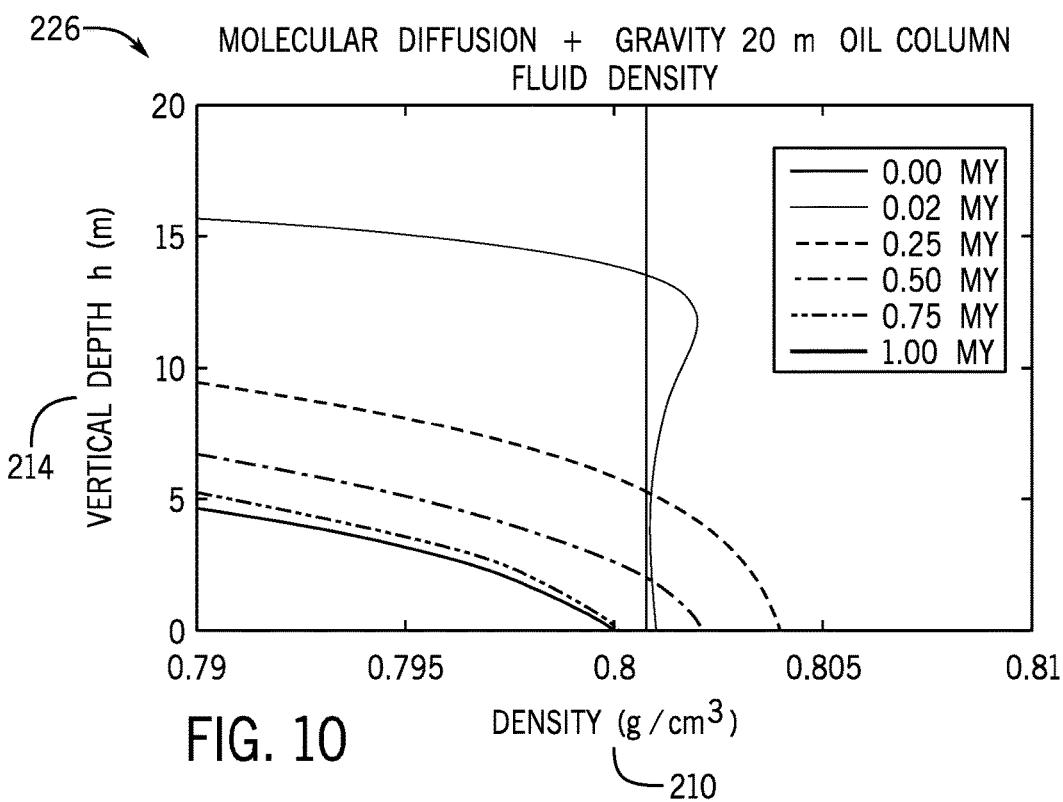
FIG. 10 is a representative plot of density as a function of vertical depth for a reservoir undergoing a gas diffusion reservoir fluid geodynamic process simulated using a diffusive model that includes gravitational diffusion, in accordance with an embodiment.

As discussed above, the diffusive model disclosed herein may be used to simulate fluid geodynamic processes for gas charge into the reservoir 8. FIGS. 7-10 are representative plots of an example reservoir illustrating density 210 in grams (g)/cubic centimeter ($cm^3$) as a function of true vertical depth (TVD) 214 in meters (m). FIGS. 7 and 8 illustrate plots 218, 220 of the example reservoir having a thickness of 100 m and 20 m, respectively. The density changes of the example reservoir illustrated in the plots 218, 220 were simulated in the absence of gravitational diffusion of the components in the reservoir fluid (e.g., the reservoir fluid 50). FIGS. 9 and 10 illustrate plots 224, 226 of an example reservoir having a thickness of 100 m and 20 m, respectively, simulated in the presence of gravitation diffusion of the components in the reservoir fluid. That is, the plots 224, 226 of FIGS. 9 and 10 were simulated using the diffusive model disclosed herein. For simulations in the presence and absence of gravitational diffusion of components in the reservoir fluid, the fraction of asphaltene clusters was set to zero. As shown in FIGS. 7 and 8, without gravitational diffusion, density inversion is created before the gas front reaches the base of the oil column (e.g., the reservoir 8) during late gas charge. For example, after a large amount of the gas arrives at the base of the reservoir (e.g., over 0.7 million years (MY)), enriching gas components in the oil (e.g., the immature oil 132) may result in a reduction of fluid density as shown in FIG. 8. In contrast, by using both molecular and gravitational diffusion (e.g., FIGS. 9 and 10), small density inversion may be generated early at or near the top 140 of the reservoir 8, and large density inversion may be generated at the base (e.g., the bottom 146 of the oil column due, in part, to gravitational diffusion. Therefore, the fluid density of the reservoir fluid 50 may be greater than the density of the immature oil 132 (e.g., the original reservoir fluid) at the bottom 146 (e.g., at reservoir sealing blocks) in a short amount of time (e.g., less than approximately 0.7 million years (MY)). The density inversion may create gravity currents (e.g., convections), thereby moving asphaltenes down to the bottom 146 (e.g., base) of the oil column at an accelerated rate. Such phenomena provides support for the gravitational support equation of the present disclosure.

Figure 11:
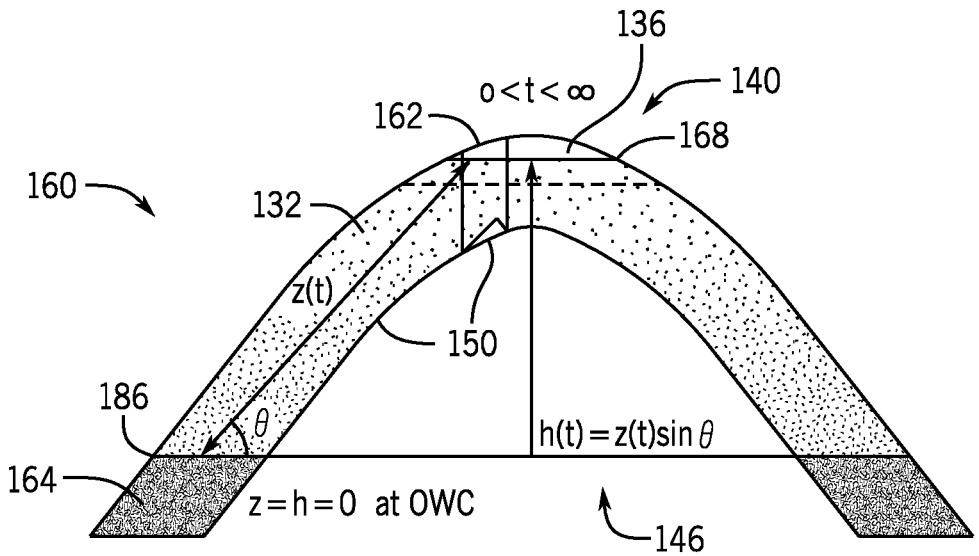
FIG. 11 is a diagram of an example of an anticline reservoir undergoing gas diffusion and having asphaltenes migrating down toward bottom sealing rocks of the anticline reservoir, in accordance with an embodiment.

For example, FIG. 11 illustrates the anticline reservoir 160 having separation of the asphaltenes 150 from the immature oil 132 near the top 140, as a result of the late gas charge into the reservoir 160. The fluid density inversion generated at bottom sealing rocks near the bottom 146 of the reservoir 160 in a short period of time (e.g., less than approximately 0.7 million years (MY)) facilitates formation of gravity currents, which speed migration of the asphaltenes 150 from the top 140 to the bottom 146 of the reservoir 160.

Figure 12:
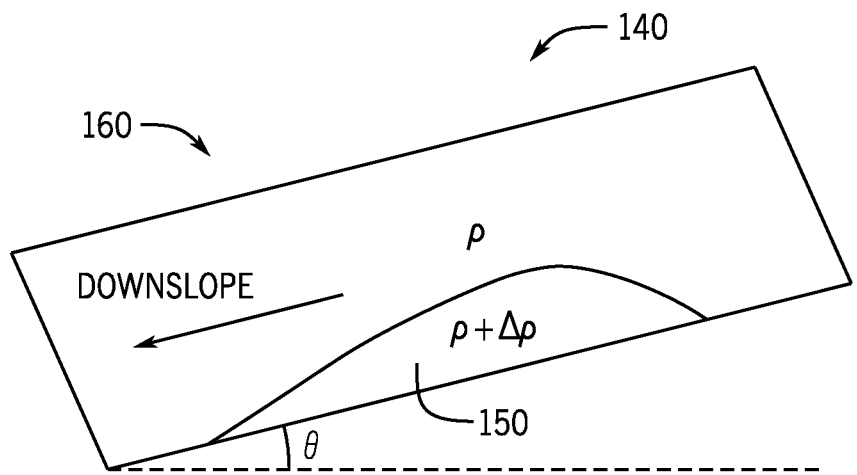
FIG. 12 is a diagram of a top portion of the anticline reservoir of FIG. 10 showing asphaltenes migrating down toward bottom sealing rocks of the anticline reservoir, in accordance with an embodiment.

The gravity current migration model is a two-dimensional (2-D) incline planar porous and permeable layer that is initially saturated with oil having a relatively low density p. A density inversion of $\Delta\rho$ may be created due to the immature oil 132 being charged with the gas 136. The late gas charge results in a gravitational flow (or equivalently, buoyancy flow), which may be predominantly dependent on density contrast and the dip angle $\theta$, as shown in FIG. 12. The propagation of the gravity current may be modeled by a convective equation based on the general theory of Darcy flow and mass conservation and expressed as follows:

$$\frac{\partial h}{\partial t} = \frac{\Delta \rho g k}{\phi \eta}\left(\sin\theta \frac{\partial h}{\partial z} + \frac{\cos\theta}{2}\nabla^{22}\right) \quad (32)$$

where z is the distance from the initial influx location, h is the height at given location, k is permeability of the layer, and $\phi$ is porosity, $\eta$ is the viscosity, and $\theta$ is the dip angle of the slope. The first term on the right hand side represents the gravity driven convection downslope, and the second term represents spreading perpendicular to the slope.

The extent initial downslope of the asphaltenes 150 varies slowly. After sufficient time, the gravity current reaches a second regime, where downslope flow dominates the propagation at the constant characteristic velocity given by $$u = \frac{\Delta \rho g k \sin\theta}{\phi \eta} \quad (33)$$

In this regime, the downslope distance increases linearly with time, and does not depend on the assumption of the volume of the gravity current. In addition, equation 33 shows that the convection length scale is linear to t, in contrast, the diffusion length scale varies with $t^{1/2}$. For example, if a reservoir has permeability k=300 mD, porosity ϕ=0.2, viscosity η=1 cP, dip angle θ=5°, and density inversion Δρ=1 kg/m³, the estimated gravity current velocity is 40 km per million years, which is much faster than diffusion (~0.1 km per million years). Therefore, the created density inversion can migrate asphaltenes to the base of the oil column over geological time.

Figure 13:
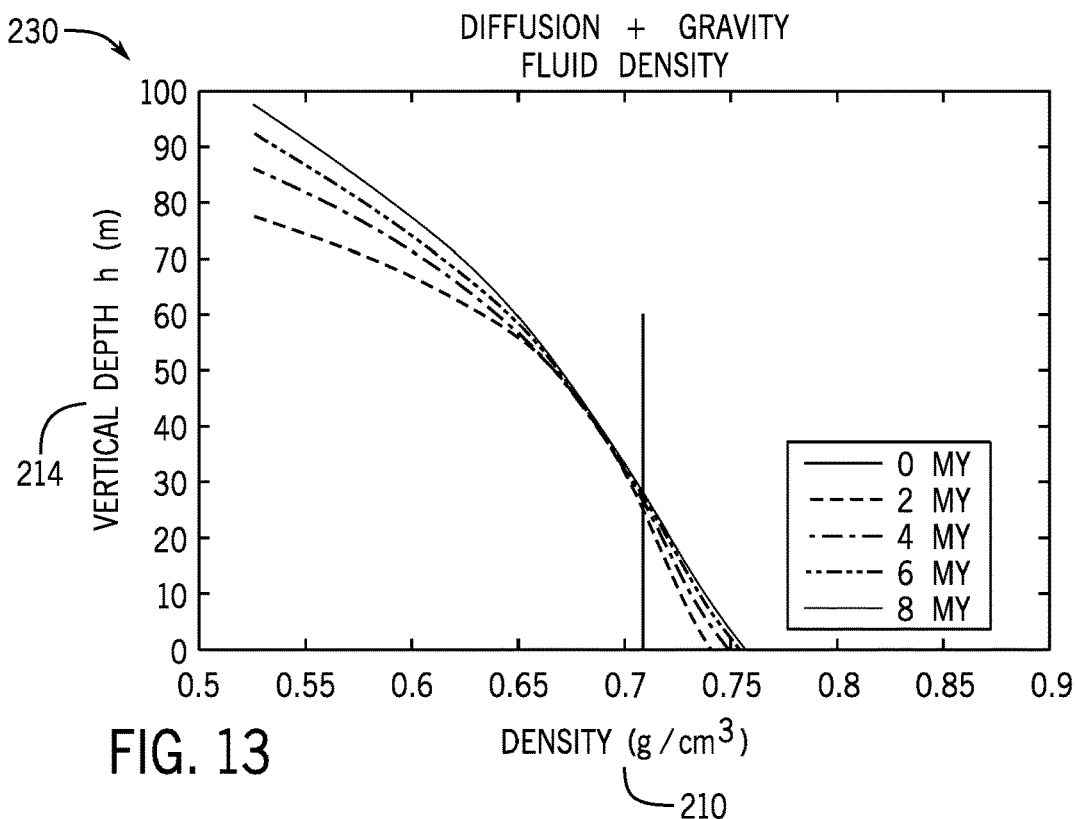
FIG. 13 is a representative plot of density as a function of vertical depth for a reservoir undergoing a gas diffusion reservoir fluid geodynamic process simulated using a diffusive model that includes gravitational diffusion, in accordance with an embodiment.
Figure 14:
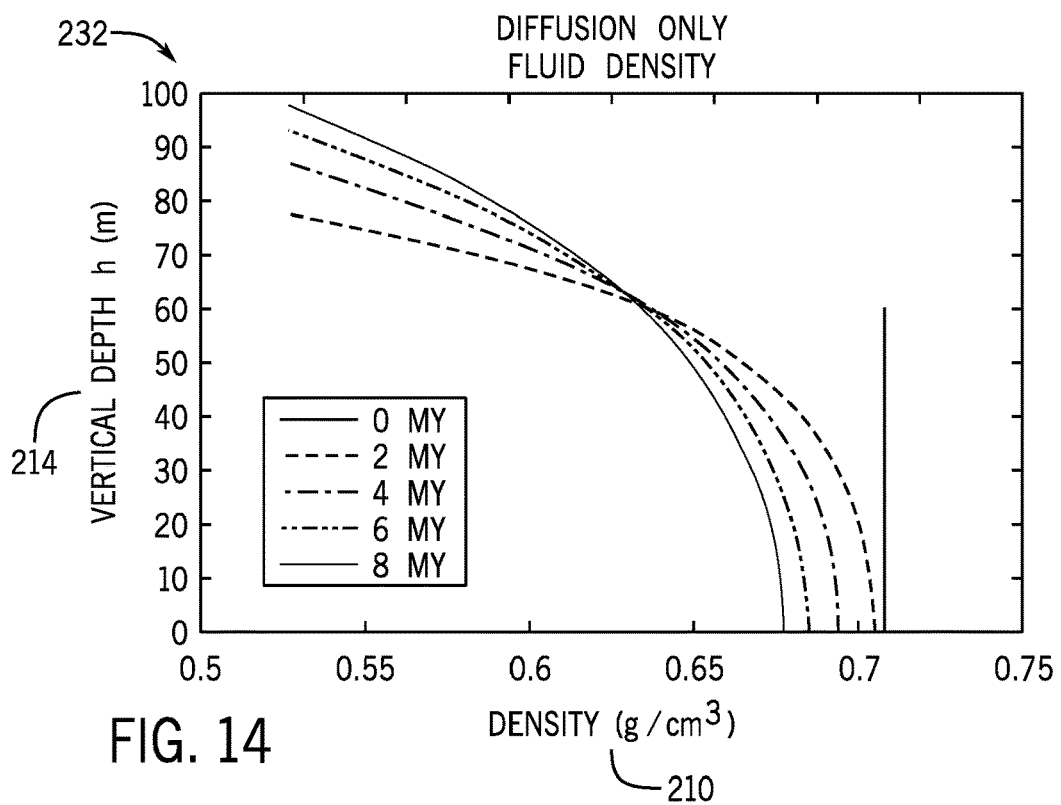
FIG. 14 is a representative plot of density as a function of vertical depth for a reservoir undergoing a gas diffusion reservoir fluid geodynamic process simulated using a diffusive model that does not include gravitational diffusion, in accordance with an embodiment.
Figure 15:
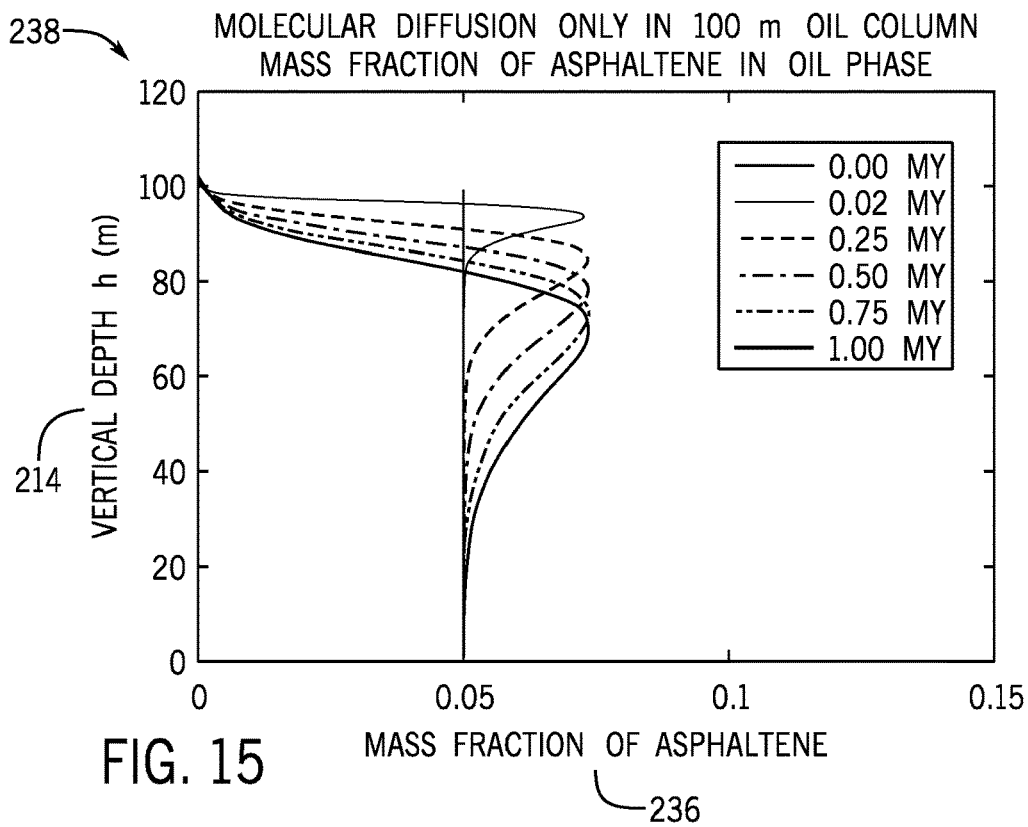
FIG. 15 is a representative plot of asphaltene content as a function of vertical depth for a reservoir undergoing a gas diffusion reservoir fluid geodynamic process simulated using a diffusive model that does not include gravitational diffusion, in accordance with an embodiment.
Figure 16:
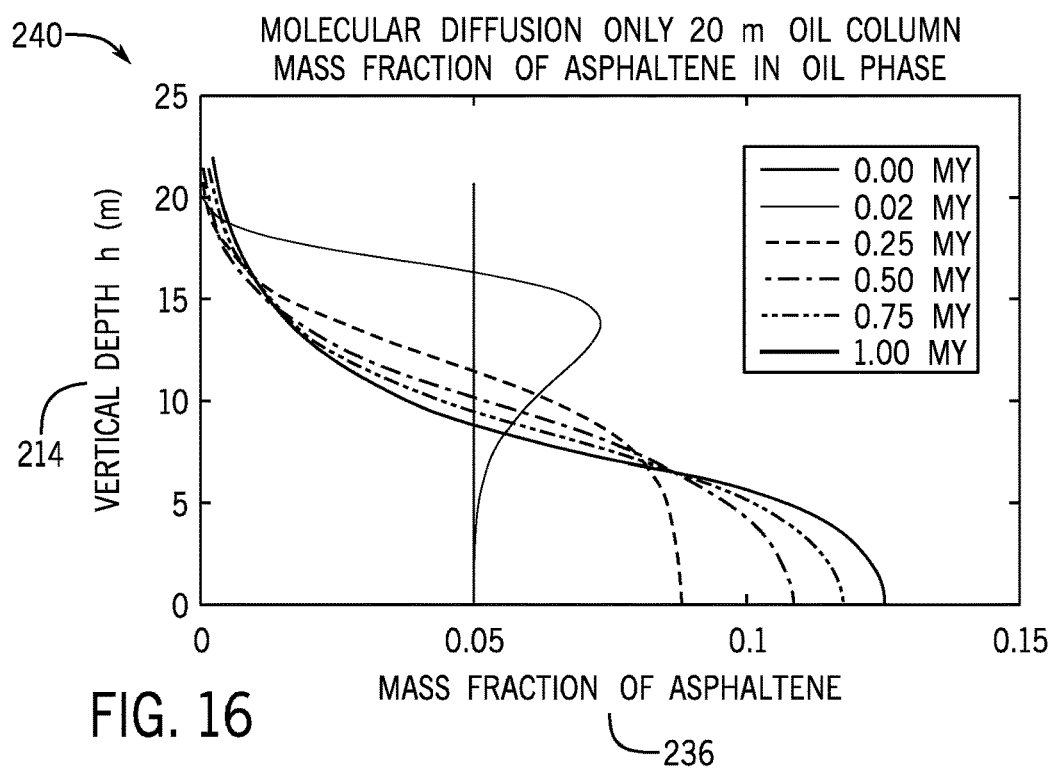
FIG. 16 is a representative plot of asphaltene content as a function of vertical depth for a reservoir undergoing a gas diffusion reservoir fluid geodynamic process simulated using a diffusive model that does not include gravitational diffusion, in accordance with an embodiment.

FIGS. 13 and 14 also illustrate representative plots 230, 232 of the density gradients 210 as a function of vertical depth 214 of an example reservoir simulated using diffusive models with and without gravitational diffusion, respectively. The diffusive model that includes gravitational diffusion results in a small density inversion at the base of the reservoir. This phenomena is not shown in FIG. 13 because the gas front appears to reach the base of the oil column (e.g., the reservoir 8) at 2 million years (MY)). In contrast, the diffusive model that does not include gravitation diffusion (e.g., FIGS. 14) indicates a lower density than that of the original oil (e.g., the immature oil 132) due, in part, to the gas front reaching the base of the oil column. Density inversion of the reservoir fluid does not appear to affect migration of the asphaltenes 150 toward of the bottom 146 of the reservoir 8.

Figure 17:
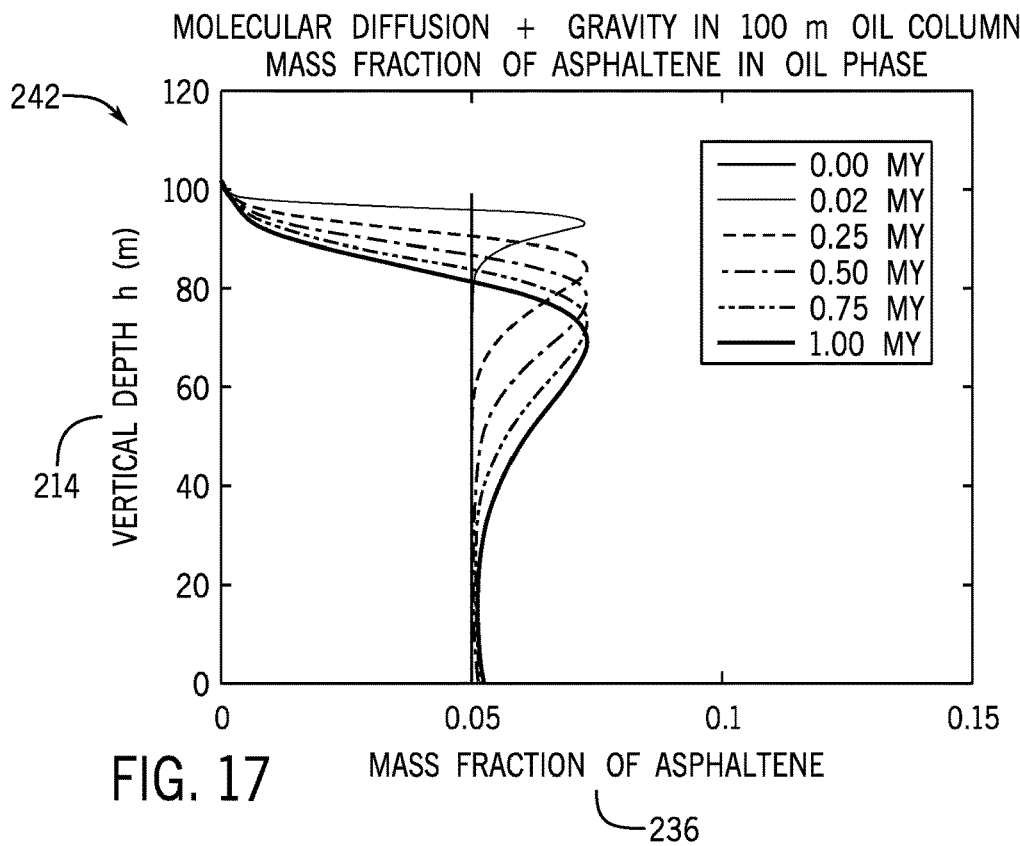
FIG. 17 is a representative plot of asphaltene content as a function of vertical depth for a reservoir undergoing a gas diffusion reservoir fluid geodynamic process simulated using a diffusive model that includes gravitational diffusion, in accordance with an embodiment.
Figure 18:
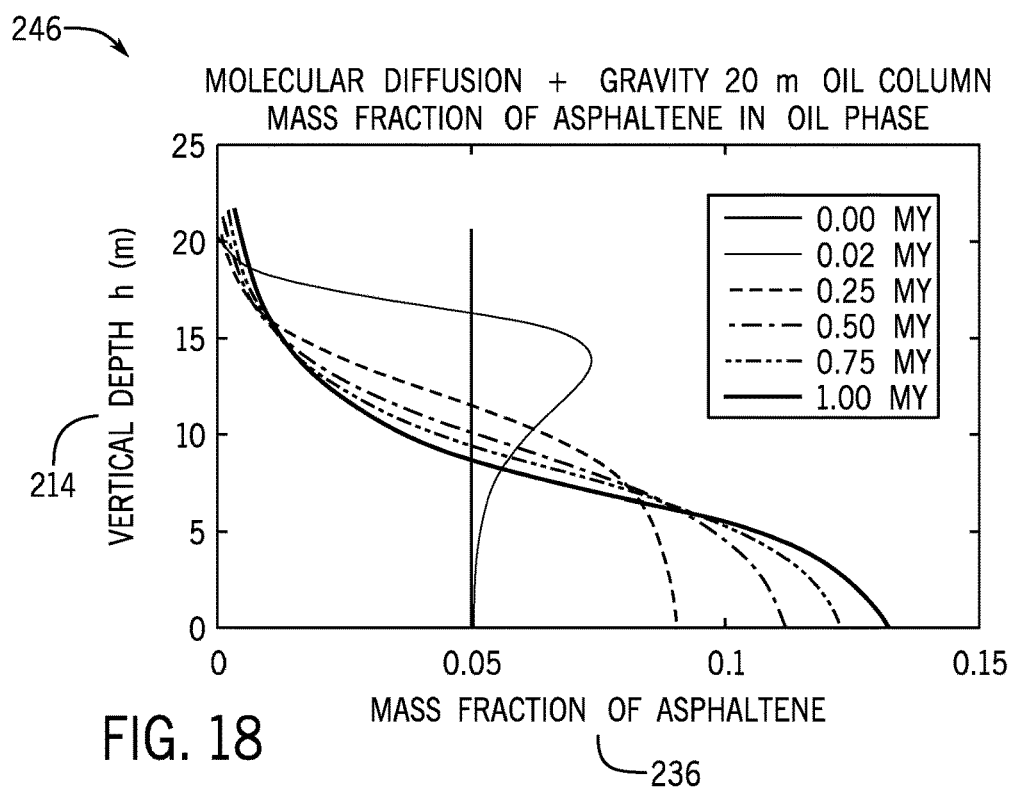
FIG. 18 is a representative plot of asphaltene content as a function of vertical depth for a reservoir undergoing a gas diffusion reservoir fluid geodynamic process simulated using a diffusive model that includes gravitational diffusion, in accordance with an embodiment.

FIGS. 15-18 are representative plots of an example reservoir illustrating the asphaltene distribution (e.g., mass fraction of asphaltene) 236 as a function of the vertical depth (VD) 214 in the presence and absence of gravitational diffusion during late gas charge. For example, 15 and 16 illustrate plots 238, 240 of the example reservoir having a thickness of 100 m and 20 m, respectively, simulated using diffusive models in the absence of gravitational diffusion of the components of the reservoir fluid. FIGS. 17 and 18 illustrate plots 242, 246 of an example reservoir having a thickness of 100 m and 20 m, respectively, simulated in the presence of gravitation diffusion of the components in the reservoir fluid. Without gravitational diffusion, it may take an extended time for the asphaltenes 150 to migrate down to the base (e.g., bottom 146) of the oil column (e.g., the reservoir 8). For example, the asphaltenes 150 may move down to the bottom 146 in approximately 30 million years to over approximately over 1 million years. However, with gravitational diffusion, the asphaltenes 150 may easily migrate down to the bottom sealing rocks at a crest of the reservoir 8, as shown if FIGS. 11, 12. 15, and 16. Therefore, gravity instability induced convection may accelerate the asphaltene migration process.

Figure 19:
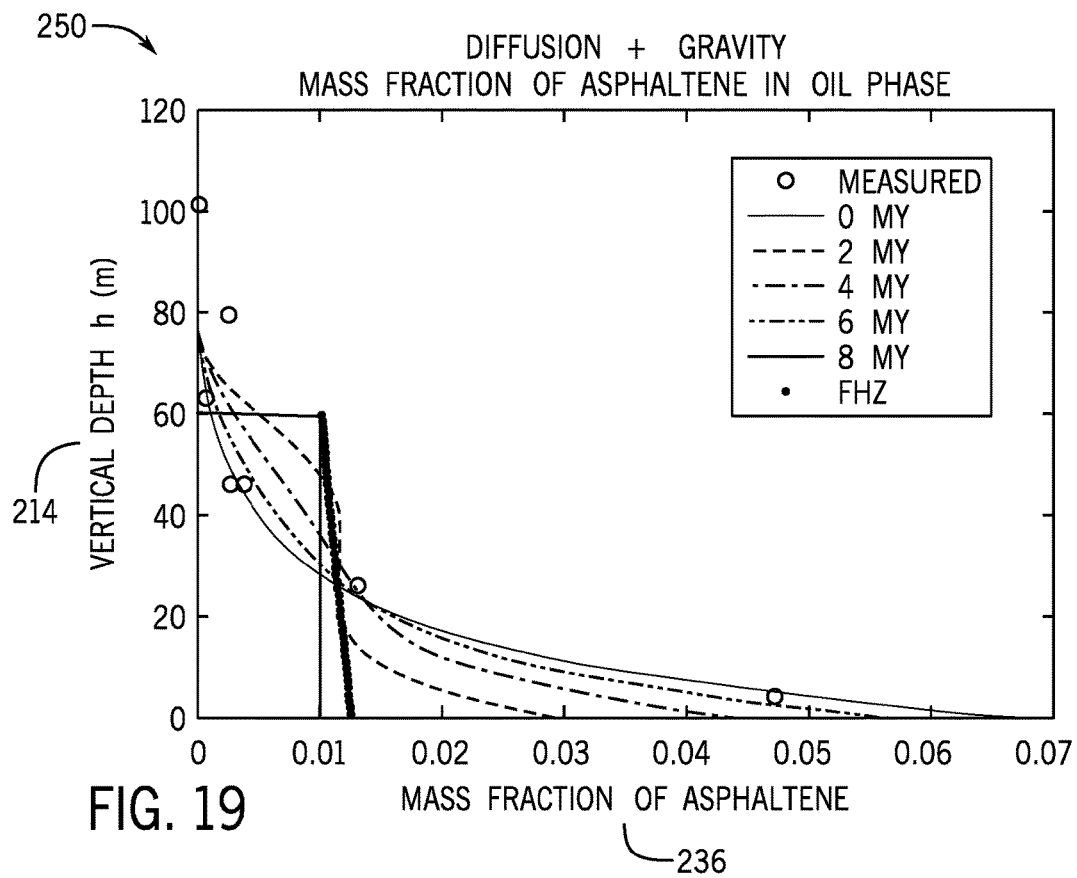
FIG. 19 is a representative plot of asphaltene content as a function of vertical depth for a reservoir undergoing a gas diffusion reservoir fluid geodynamic process simulated using a diffusive model that includes gravitational diffusion, in accordance with an embodiment.
Figure 20:
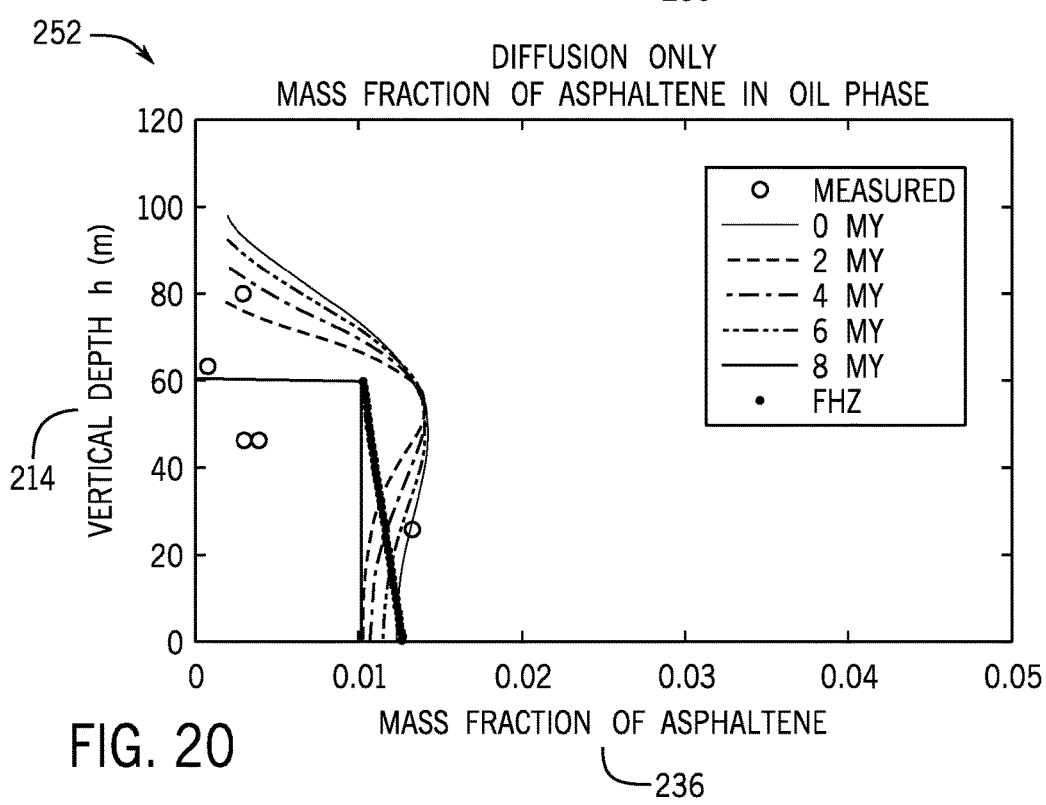
FIG. 20 is a representative plot of asphaltene content as a function of vertical depth for a reservoir undergoing a gas diffusion reservoir fluid geodynamic process simulated using a diffusive model that does not include gravitational diffusion, in accordance with an embodiment.

Similarly, FIGS. 19 and 20 are representative plots 250, 252 of asphaltene distribution (e.g., mass fraction of asphaltene) 236 as a function of the vertical depth (VD) 214 of example reservoirs simulated using the diffusive model disclosed herein with and without gravitational diffusion, respectively. As illustrated in FIG. 19, the data generated using the diffusive model that includes gravitational diffusion aligns with the measured data at 8 million years (MY). In contrast, the diffusive model that does not include gravitational diffusion (e.g., FIG. 20) does not align with the measured data. The equilibrium asphaltene gradients predicted by the Flory-Huggins-Zuo equation of state (FHZ EOS) model without considering late gas charge into the reservoir are also compared in FIGS. 19 and 20. Based on the comparison between the plots 250, 252, the diffusive model disclosed herein, which includes gravitational diffusion, increases the accuracy of simulating field reservoirs compared to diffusive models that do not include gravitational diffusion.

Figure 21:
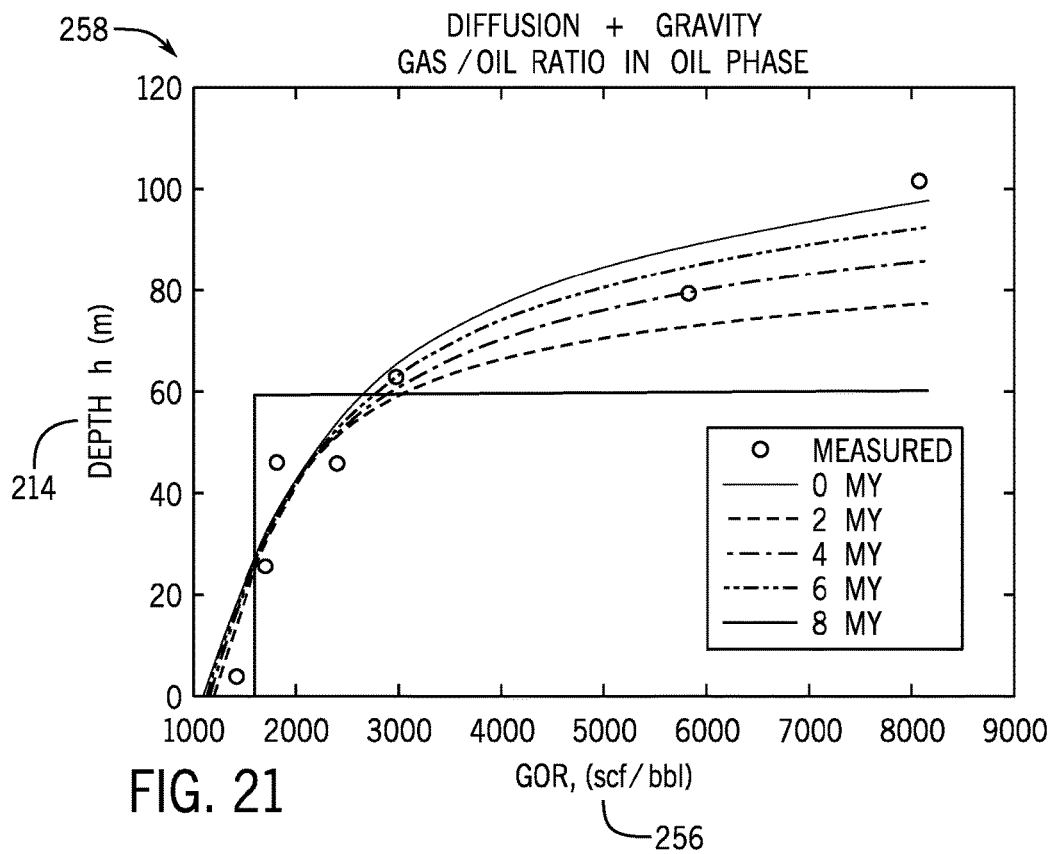
FIG. 21 is a representative plot of gas-to-oil ratio (GOR) as a function of vertical depth for a reservoir undergoing a gas diffusion reservoir fluid geodynamic process simulated using a diffusive model that includes gravitational diffusion, in accordance with an embodiment.
Figure 22:
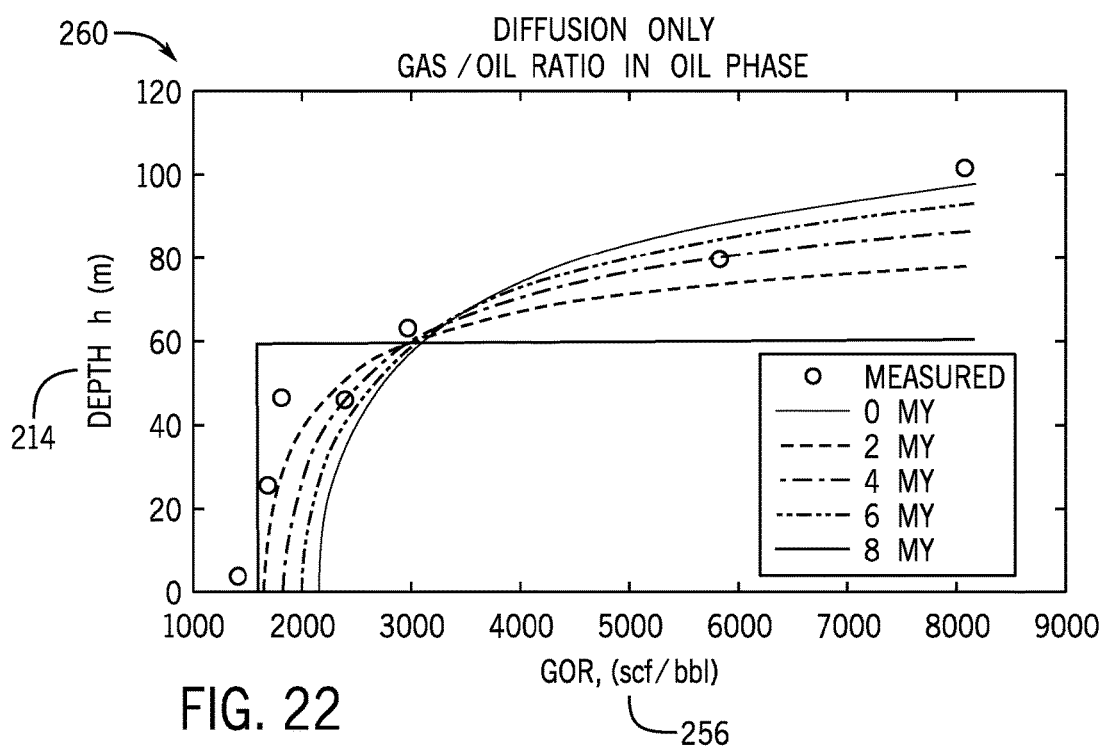
FIG. 22 is a representative plot of GOR as a function of vertical depth for a reservoir undergoing a gas diffusion reservoir fluid geodynamic process simulated using a diffusive model that does not include gravitational diffusion, in accordance with an embodiment.

As discussed above with reference to FIG. 6, gas-to-oil ratios (GOR) in a reservoir may be simulated using the diffusive model disclosed herein. FIGS. 21 and 22 are representative plots of an example reservoir illustrating GOR in standard cubic feet (scf)/barrel (bbl) 256 as a function of the vertical depth (TVD) 214 in meters. For example, FIG. 17 illustrates a plot 258 of an example reservoir simulated using diffusive models that do not include gravitational diffusion of components of the reservoir fluid. In contrast, FIG. 18 illustrates a plot 260 of the example reservoir simulated using the diffusive model disclosed herein, which includes gravitational diffusion of the components of the reservoir fluid. As shown in FIGS. 17 and 18, the diffusive model with and without the gravitational diffusion at 8 million years (MY) fit the measured GOR (e.g., GOR measured using the downhole acquisition tool 12). The diffusive model that does not include gravitational diffusion may indicate a larger GOR than that of the original oil (e.g., the immature oil 132) at longer time periods due, in part, to the gas front reaching the base of the oil column (e.g. the reservoir 8), as shown in FIG. 17.

Figure 23:
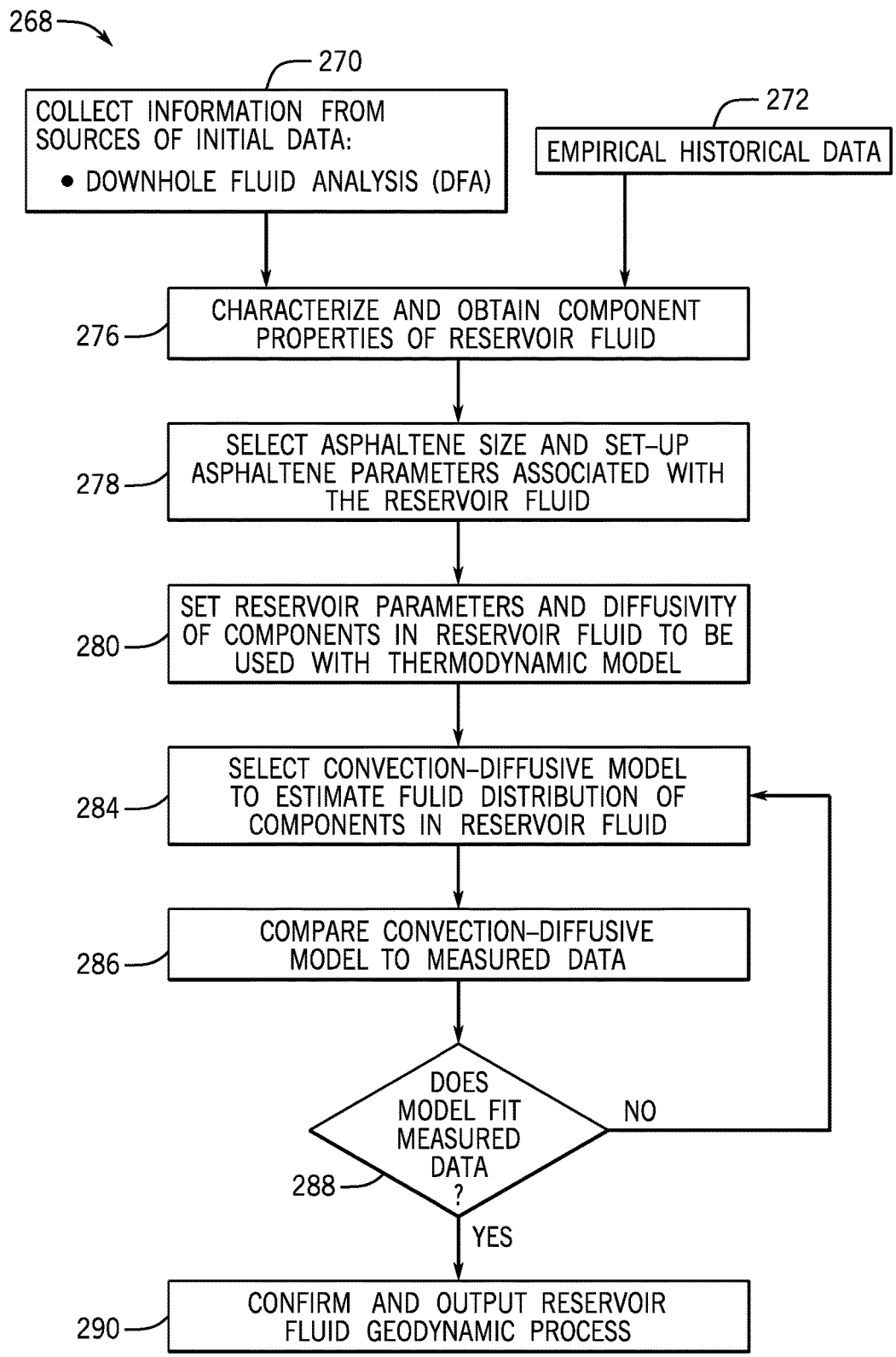
FIG. 23 is a flow chart of an embodiment of a method that simulates reservoir fluid geodynamic processes in a reservoir using a diffusive model that includes gravitational diffusion of reservoir fluid components.

Embodiments of the present disclosure also include methods for modeling diffusion of the gas 136 in the reservoir 8 using the diffusive and advective model with gravitational diffusion discussed above. For example, a method for modeling diffusion in a hydrocarbon reservoir (e.g., the reservoir 8) is illustrated in flowchart 268 of FIG. 23. In the illustrated flowchart 268, information from sources of initial data may be collected (block 270). The sources of the initial data may include the data 70 from the downhole fluid analysis (DFA). In addition to the data obtained according to block 270, the method 268 includes obtaining empirical data (e.g., laboratory data) of the reservoir fluid 50 associated with the reservoir 8 (block 272). The data may include parameters such as, but not limited to, compositions, GOR, optical density (OD), asphaltene content, temperature, pressure, density, viscosity, or any other suitable data collected by the downhole acquisition tool 12 or laboratory equipment.

Reservoirs having fluid behaviors similar to the reservoir 8 may have behaviors due to similar dynamic processes. As such, the data 70 may be compared to fluid behavior information that may be obtained from petroleum systems modeling (PSM) of the reservoir 8 and/or empirical data 272 to characterize and obtain component properties of the reservoir fluid 50 from the reservoir 8 (block 276). Indeed, as discussed above, the data 70 from the DFA may provide information regarding the gas-to-oil ratio (GOR), viscosity, density, and/or composition (e.g., asphaltene content) of the reservoir fluid 50 at different depths (e.g., the depth 138) of the reservoir 8. Any changes in the measured data 70 and/or reservoir productivity from the routine sequence and behavior may indicate to the operator that the reservoir 8 may be in disequilibrium and/or one or more dynamic processes have occurred or are currently occurring. The DFA information generated from the data 70 may identify one or more gradients (e.g., viscosity gradients, density gradients, GOR gradients, asphaltene concentration gradients, etc.) in the reservoir fluid 50 that may be associated with one or more dynamic processes (e.g., one of the dynamic processes discussed above). This information may be used to characterize and obtain component properties of the reservoir fluid 50. For example, the data 70 and/or the empirical data may be used in equation of state (EOS) models to determine molar mass, solubility parameters, partial molar volume, partial density, and any other desirable characteristic and property of the reservoir fluid 50 and its components.

Following characterization of the reservoir fluid, the method 268 includes selecting asphaltene size and setting-up asphaltene parameters (block 278). The asphaltene size may affect the stability of the reservoir 8. For example, asphaltene molecules with molar mass of ~750 g/mol may cause an increase methane concentration in the reservoir fluid 50. Thus, generally no asphaltene instability issues may exist because reservoir conditions are often far away from the unstable region. The asphaltene size may be selected according to the Yen-Mullins model.

The method 268 also includes using a thermodynamic model (e.g., Flory-Huggins model) to set-up reservoir parameters and diffusivities ($D_{ij}$) of the reservoir fluid 50 (block 280). For example, it may be assumed that reservoir 8 is undergoing a reservoir fluid geodynamic process. Initial and boundary conditions of the reservoir 8 may be set-up according to the reservoir fluid geodynamic process. Additionally, grids for the reservoir 8 may be set-up accordingly for one-dimensional (1-D), two-dimensional (2-D), or three-dimensional (3-D) simulations of the reservoir 8.

The method 268 also includes selecting a convection-diffusion partial differential equation (PDE) model to estimate fluid distribution of the reservoir fluid 52 resulting from late gas charge into the reservoir 8 (block 284). For example, the convection-diffusion PDE models may provide fluid properties such as, but not limited to, composition, gas-to-oil ratio (GOR), density, asphaltene content distributions, and any other suitable fluid property. The convection-diffusion PDE model may include terms for molecular diffusions, convection, gravity, or any suitable terms such as reactions, sinks, and/or sources. As discussed above, by incorporating gravitational diffusion in the diffusive model, estimating the fluid distribution of the reservoir fluid 52 may be increased compared to using models that do not include the gravitational diffusion.

The method 268 also includes comparing the fluid distribution modeled using the diffusive model with measured fluid gradients (e.g., the data 70) obtained using the downhole acquisition tool 12 (block 286). By comparing (e.g., fitting) the measured fluid gradients and the diffusive model, the method disclosed herein may determine if the reservoir 8 is in equilibrium or disequilibrium, and may predict the one or more reservoir fluid geodynamic processes causing the gradients.

The method 268 also includes determining whether the diffusive model fits the measured data at query 288. For example, if the measured fluid gradient fits the diffusive model, the data processing system 54 may determine and confirm the fluid geodynamic process occurring in the reservoir 8 (block 290). Conversely, if the measured fluid gradient does not fit the diffusive model, the data processing system 54 may determine that the PDE parameters should be updated (block 294), and the acts of blocks 284 and 286 are repeated.

The combination of the data 70 from the downhole fluid analysis (DFA) and the diffusive model may also facilitate predicting a location where the reservoir fluid geodynamic process is occurring. For example, the data 70 from the DFA and the diffusive model may provide information as to where in the reservoir 8 certain events associated with the identified reservoir fluid geodynamic processes are located. For example, gas diffusion (e.g., continuous or discontinuous) may result in various fluid gradients (e.g., GOR, bubble point, gravity, and asphaltene onset pressure) that may affect reservoir productivity. The location of the gas diffusion may be located at depths where the gas content (e.g., GOR determined from DFA) is higher and the asphaltene content (e.g., measured using DFA) is lower than predicted by the diffusive model. As described in further detail below, knowing the location of the events (e.g., reservoir fluid geodynamic processes) along a vertical depth of the reservoir 8 may facilitate oil recovery and reservoir production operations.

Once the one or more reservoir fluid geodynamic processes for the measured fluid gradients have been determined, the information obtained from the acts of blocks 276, 280, 284, 286, and 290 may be used to define future dynamic formation analysis. Information associated with the type and location of the reservoir fluid geodynamic processes may be used as input parameters for the dynamic formation analysis. The dynamic formation analysis may then be used to investigated future logging campaigns and models in reservoir simulators (e.g., petroleum system modeling). Additionally, the identified dynamic processes may suggest potential issues, and the location of the potential issues, within the reservoir 8 that may impact reservoir productivity. As such, an operator may plan where and how to implement reservoir drilling operations that may recover a desirable amount of hydrocarbons (e.g., the reservoir fluid 52) from the reservoir 8, and plan surface facility design. Moreover, the dynamic processes identified, according to block 290, may be used to determine enhanced oil recovery (EOR) techniques to increase productivity of the reservoir 8 that may be affected by the reservoir fluid geodynamic processes. For example, in the case of gas diffusion, an operator may manage the gas diffusion by keeping fluid pressure above a saturation pressure of the gas, which may vary at different locations in the reservoir due to the influence of the gas diffusion. The operator may also design the facilities at surface to accommodate the volume of gas that may be produced as a result of the gas diffusion. If the dynamic processes indicate the presence of bitumen deposits upstructure, the operator may use organic scale treatments (e.g., xylene washes) to improve the reservoir productivity during reservoir development operations and/or EOR. Therefore, the data processing system 54 may use the information generated from the acts of the method 268 to identify the dynamic processes occurring within the reservoir 8 and identify potential issues, and their location, that may impact reservoir productivity for wellbores within the reservoir 8 and/or other reservoirs having fluid behaviors similar to that of reservoir 8.

The identified dynamic processes within the reservoir 8 may be used to plan logging measurements that are used to characterize reservoirs and mitigate potential problems that may be associated with the reservoirs. By way of example, the information obtained from the identified dynamic processes may provide information as to where potential problems may occur within the reservoir 8. As such, the operator may plan where in the reservoir 8 logging measurements are acquired. The logging measurements may also be used to validate the identified dynamic process. For example, the logging measurements may be fitted to the diffusive model. In certain embodiments, lab data for the reservoir 8 may be compared to the identified dynamic process to validate and determine the accuracy of the dynamic process identified from the acts of the method 268.

As discussed above, reservoir fluid geodynamics may be used to model dynamic fluid behaviors, and provide accurate and reliable information associated with hydrocarbon timing (e.g., age), type (e.g., light oil, heavy oil), fluid distributions (e.g., gradients), and volume of the reservoir fluid. This information may be used to identify and locate dynamic processes within a reservoir that may affect reservoir productivity. By knowing the dynamic processes affecting the reservoir productivity, operators may determine which enhance oil recovery (EOR) techniques may increase reservoir productivity. By using the diffusive model disclosed herein, which includes gravitational diffusion, the accuracy of the identified dynamic process may be improved compared to diffusive models that do not include gravitational diffusion.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

The invention claimed is:

1. A method comprising:
   placing a downhole acquisition tool in a wellbore in a geological formation within a hydrocarbon reservoir, wherein the wellbore or the geological formation, or both, contain a reservoir fluid;
   performing downhole fluid analysis using the downhole acquisition tool in the wellbore to determine at least one measurement associated with the reservoir fluid; and
   using a processor to:
      estimate at least one fluid component property by using an equation of state based at least in part on at least one measurement associated with the reservoir fluid;
      simulate a diffusion process using a diffusive model that takes into account the at least one estimated fluid property, wherein the diffusive model accounts for gravitational diffusion of at least one or more components in the reservoir fluid;
      estimate one or more reservoir fluid geodynamic processes based at least in part on the at least one fluid property;
      compare the estimated one or more reservoir fluid geodynamic processes with the at least one measurement associated with the reservoir fluid; and
      output one or more reservoir fluid geodynamic processes corresponding to the at least one measurement associated with the reservoir fluid;
   wherein diffusive model accords with the following relationship:

$$d_i = -\frac{x_i}{RT}\nabla_T \mu_i + \frac{x_i}{RT}M_i g = \sum_{\substack{j=1 \\ j \neq i}}^{N} \frac{x_j J_i - x_j J_j}{C_i D_{ij}}, i = 1, 2, \ldots, N$$

where
   R represents the universal gas constant;
   T represents temperature of the reservoir fluid;
   $d_i$ represents the driving force vector of component i in the reservoir fluid;
   g represents gravitational accelerations
   x represents the mole fraction of the component i in the reservoir fluid;
   $M_i$ represents the molar mass of the component i in the reservoir fluid;
   $\mu_i$ represents the chemical potential of the component i in the reservoir fluid;
   $D_{ij}$ is the Maxwell-Stefan diffusivity between component i and a component j, respectively, of the reservoir fluid; and
   $\nabla_T$ is a gradient of the component i at isothermal conditions;
   J is the molar flux vector at isothermal conditions.

2. The method of claim 1, wherein the at least one measurement comprises reservoir temperature data, pressure data, fluid composition data, or any combination thereof.

3. The method of claim 1, wherein the at least one fluid component property comprises partial molar volume, molar mass, partial density, initial conditions, boundary conditions, solubility parameters, asphaltene cluster size, or any combination thereof.

4. The method of claim 1, wherein the molar flux accords to the following relationship:

$$J = J^{mol} + J^{grav} = -C_t[B]^{-1}[\Gamma]\nabla x -$$
$$C_t[B]^{-1}\frac{x_a \overline{V}_a \Delta \rho g \sin(\theta)}{RT}(1 - \varphi_{clusters}) + C_t x_a u_{clusters}\varphi_{clusters}$$

where $$\Gamma_{ij} = \Delta_{ij} + x_i \frac{\partial \ln \gamma_i}{\partial x_j};$$

where $\Delta_{ij}$ represents the Kronecker delta function and γ represents the activity coefficient of a component i of the reservoir fluid;
   B represents a matrix of drag effects;
   C is the molar concentration of the component i of the reservoir fluid;
   ρ represents the mass density of the reservoir fluid;
   $\overline{V}$ represents the molar volume of nanoaggregates; and
   subscript a denotes a term for asphaltenes in the reservoir fluid.

5. The method of claim 4, wherein the location comprises a depth of the wellbore.

6. The method of claim 1, comprising predicting a location within the hydrocarbon reservoir where the one or more reservoir fluid geodynamic processes takes place based at least in part on the modeling of the hydrocarbon reservoir according to the diffusive model.

7. The method of claim 1, wherein the one or more reservoir fluid geodynamic processes comprises hydrocarbon biodegradation, gas diffusion, fault block migration, or subsidence, convective currents, or any combination thereof.

8. One or more tangible, non-transitory, machine-readable media comprising instructions to:
   receive at least one measurement representative of a portion of a reservoir fluid as analyzed by a data acquisition tool in a wellbore in a geological formation within a hydrocarbon reservoir;
   estimate at least one fluid component property by using an equation of state;
   simulate a diffusion process using a diffusion model that takes into account the at least one estimated fluid property, wherein the diffusive model accounts for gravitational diffusion of at least one or more components in the reservoir fluid;

estimate one or more reservoir fluid geodynamic processes based at least in part on the at least one fluid property; and compare the one or more reservoir fluid geodynamic processes with the at least one measurement associated with the reservoir fluid;

wherein the diffusive model accords with the following relationship:

$$d_i = -\frac{x_i}{RT}\nabla_T \mu_i + \frac{x_i}{RT} M_i g = \sum_{\substack{j=1 \\ j \neq i}}^{N} \frac{x_j J_i - x_i J_j}{C_i D_{ij}}, i = 1, 2, \ldots, N$$

where
R represents the universal gas constant;
T represents temperature of the reservoir fluid;
$d_i$ represents the driving force vector of component i in the reservoir fluid;
g represents gravitational accelerations
x represents the mole fraction of the component i in the reservoir fluid;
$M_i$ represents the molar mass of the component i in the reservoir fluid;
$\mu_i$, represents the chemical potential of the component i in the reservoir fluid;
$D_{ij}$ is the Maxwell-Stefan diffusivity between component i and a component j, respectively, of the reservoir fluid; and
$\nabla_T$ is a gradient of the component i at isothermal conditions;
J is the molar flux vector at isothermal conditions.

9. The one or more tangible, non-transitory, machine-readable media of claim 8, comprising instructions to estimate the at least one fluid component property with empirical historical data associated with the hydrocarbon reservoir.

10. The one or more tangible, non-transitory, machine-readable media of claim 8, comprising instructions to execute diffusion model at varying depths of the geological formation to predict a location within the hydrocarbon reservoir where the one or more reservoir fluid geodynamic processes takes place.

11. The one or more tangible, non-transitory, machine-readable media of claim 8, wherein the molar flux accords to the following relationship:

$$J = J^{mol} + J^{grav} = -C_t[B]^{-1}[\Gamma]\nabla x -$$

$$C_t[B]^{-1}\frac{x_a \overline{V}_a \Delta \rho g \sin(\theta)}{RT}(1 - \varphi_{clusters}) + C_t x_a u_{clusters}\varphi_{clusters}$$

where $$\Gamma_{ij} = \Delta_{ij} + x_i \frac{\partial \ln \gamma_i}{\partial x_j};$$

where $\Delta_{ij}$ represents the Kronecker delta function and $\gamma$ represents the activity coefficient of a component i of the reservoir fluid;

B represents a matrix of drag effects;
C is the molar concentration of the component i of the reservoir fluid;
ρ represents the mass density of the reservoir fluid;
$\overline{V}$ represents the molar volume of nanoaggregates; and
subscript a denotes a term for asphaltenes in the reservoir fluid.

12. The one or more tangible, non-transitory, machine-readable media of claim 8, wherein the one or more reservoir fluid geodynamic processes comprises hydrocarbon biodegradation, gas diffusion, fault block migration, or subsidence, convective currents, or any combination thereof.

13. The one or more tangible, non-transitory, machine-readable media of claim 8, wherein the at least one measurement comprises reservoir temperature data, pressure data, fluid composition data, or any combination thereof.

14. The one or more tangible, non-transitory, machine-readable media of claim 8, wherein the at least one fluid component property comprises partial molar volume, molar mass, partial density, initial conditions, boundary conditions, solubility parameters, or any combination thereof.

15. A system, comprising:
a downhole acquisition tool housing comprising a sensor configured to measure at least one fluid property of a reservoir fluid within a geological formation of a hydrocarbon reservoir; and a data processing system configured to identify reservoir fluid geodynamic processes within the geological formation based on the at least one fluid property of the reservoir fluid;

wherein the data processing system comprises one or more tangible, non-transitory, machine-readable media comprising instructions to:

estimate at least one fluid component property by using a suitable equation of state;

simulate a diffusion process using a diffusion model that takes into account the at least one estimated fluid property, wherein the diffusive model accounts for gravitational diffusion of at least one or more components in the reservoir fluid;

estimate one or more reservoir fluid geodynamic processes based at least in part on the at least one fluid property;

compare the one or more reservoir fluid geodynamic processes with the at least one measurement associated with the reservoir fluid; and output the one or more reservoir fluid geodynamic processes corresponding to the at least one measurement associated with the reservoir fluid;

wherein the data processing system is configured to simulate the diffusion process according to the following relationship:

$$d_i = -\frac{x_i}{RT}\nabla_T \mu_i + \frac{x_i}{RT} M_i g = \sum_{\substack{j=1 \\ j \neq i}}^{N} \frac{x_j J_i - x_i J_j}{C_i D_{ij}}, i = 1, 2, \ldots, N$$

where
R represents the universal gas constant;
T represents temperature of the reservoir fluid;
$d_i$ represents the driving force vector of component i in the reservoir fluid;

g represents gravitational accelerations x represents the mole fraction of the component i in the reservoir fluid;

$M_i$ represents the molar mass of the component i in the reservoir fluid;

$\mu_i$, represents the chemical potential of the component i in the reservoir fluid;

$D_{ij}$ is the Maxwell-Stefan diffusivity between component i and a component j, respectively, of the reservoir fluid;

$\nabla_T$ is a gradient of the component i at isothermal conditions; and

J is the molar flux vector at isothermal conditions.

16. The system of claim 15, wherein the data processing system is configured to output the one or more reservoir fluid geodynamics at varying depths of the geological formation.

17. The system of claim 15, wherein the data processing system is configured to determine the molar flux ratio according to the following relationship:

$$J = J^{mol} + J^{grav} = -C_t[B]^{-1}[\Gamma]\nabla x -$$
$$C_t[B]^{-1} \frac{x_a \overline{V}_a \Delta \rho g \sin(\theta)}{RT}(1 - \varphi_{clusters}) + C_t x_a u_{clusters} \varphi_{clusters}$$

where $$\Gamma_{ij} = \Delta_{ij} + x_i \frac{\partial \ln \gamma_i}{\partial x_j};$$

where $\Delta_{ij}$ represents the Kronecker delta function and $\gamma$ represents the activity coefficient of the component i of the reservoir fluid;

B represents a matrix of drag effects;

C is the molar concentration of the component i of the reservoir fluid;

$\rho$ represents the mass density of the reservoir fluid;

$\overline{V}$ represents the molar volume of nanoaggregates; and subscript a denotes a term for asphaltenes in the reservoir fluid.

18. The system of claim 15, wherein the data processing system estimates the at least one fluid component property with empirical historical data associated with the hydrocarbon reservoir.

19. The system of claim 15, wherein the at least one measurement comprises reservoir temperature data, pressure data, fluid composition data, or any combination thereof.

20. The system of claim 15, wherein the at least one fluid component property comprises partial molar volume, molar mass, partial density, initial conditions, boundary conditions, solubility parameters, asphaltene cluster size, or any combination thereof.

* * * * *